(12) United States Patent
Yang

(10) Patent No.: US 10,489,881 B2
(45) Date of Patent: Nov. 26, 2019

(54) DIRECT MEMORY ACCESS FOR CO-PROCESSOR MEMORY

(71) Applicant: H3 Platform, Inc., New Taipei (TW)

(72) Inventor: Yuan-Chih Yang, Taichung (TW)

(73) Assignee: H3 Platform Inc., New Taipei (TW)

( * ) Notice: Subject to any disclaimer, the term of this patent is extended or adjusted under 35 U.S.C. 154(b) by 0 days.

(21) Appl. No.: 15/808,077

(22) Filed: Nov. 9, 2017

(65) Prior Publication Data

US 2019/0005606 A1    Jan. 3, 2019

Related U.S. Application Data

(60) Provisional application No. 62/527,902, filed on Jun. 30, 2017.

(51) Int. Cl.
*G06F 13/14* (2006.01)
*G06T 1/60* (2006.01)
(Continued)

(52) U.S. Cl.
CPC .............. *G06T 1/60* (2013.01); *B60W 50/00* (2013.01); *G05D 1/0088* (2013.01); *G06F 3/061* (2013.01);
(Continued)

(58) Field of Classification Search
CPC .... G09G 5/363; G09G 5/393; G09G 2360/06; G06T 1/20; G06T 15/005
(Continued)

(56) References Cited

U.S. PATENT DOCUMENTS

2015/0206277 A1* 7/2015 Rao ................... G06F 9/5016
                                                    345/520
2018/0314936 A1* 11/2018 Bark .................. G06N 3/08

OTHER PUBLICATIONS

Silberschatz, A., etc., Operating Systems: I/O Systems, Mar. 2011, [Retrieved on Mar. 20, 2019], Retrieved from the internet: <URL: hhttps://www.cs.uic.edu/~jbell/CourseNotes/OperatingSystems/13_IOSystems/.htmll> (Year: 2011).*
(Continued)

*Primary Examiner* — Gordon G Liu
(74) *Attorney, Agent, or Firm* — Fish & Richardson P.C.

(57) ABSTRACT

Direct memory access (DMA) is provided in a computing system that includes a central processing unit (CPU), CPU memory associated with the CPU, a graphics processing unit (GPU), GPU memory associated with the GPU, a storage device capable of direct memory access, and a peer-to-peer host bus to which the other components are electrically coupled, directly or indirectly. For each page of the GPU physical memory, a data structure representing the page of GPU physical memory is generated, a GPU virtual memory space is allocated, the GPU virtual memory space is mapped to a GPU physical memory space. Based on the data structure representing the page of GPU physical memory, the GPU physical memory space is mapped to a CPU virtual address associated with a user-space process. A direct input/output operation on the storage device is initiated using the CPU virtual address, which is mapped to the GPU physical memory, at least a bus address is generated based on the data structure representing the page of GPU physical memory, and a DMA operation is initiated based on the bus address to transfer data between the storage device and the GPU physical memory space through the peer-to-peer host bus without copying the data to the CPU memory.

58 Claims, 25 Drawing Sheets

(51) Int. Cl.
  *G06F 13/42* (2006.01)
  *G06F 3/06* (2006.01)
  *G06T 1/20* (2006.01)
  *G05D 1/00* (2006.01)
  *B60W 50/00* (2006.01)
  *G06F 13/28* (2006.01)
(52) U.S. Cl.
  CPC ............ *G06F 3/065* (2013.01); *G06F 3/0631* (2013.01); *G06F 3/0688* (2013.01); *G06F 13/28* (2013.01); *G06F 13/4282* (2013.01); *G06T 1/20* (2013.01); *B60W 2050/0005* (2013.01); *G06F 2213/0026* (2013.01); *G06F 2213/2806* (2013.01)
(58) Field of Classification Search
  USPC .................................................. 345/502, 520
  See application file for complete search history.

(56) References Cited

OTHER PUBLICATIONS

Rusling, D.A., The Linux Kernel, Jul. 15, 1999, [Retrieved on Mar. 20, 2019], Retrieved from the internet: <URL: http://cmp.felk.cvut.cz/~pisa/linux/tlk-0.8-3.pdf> (Year: 1999).*

Pallipadi, V., Add a new vm flag to track full pfnmap at mmap, Mar. 2009, [Retrieved on Mar. 20, 2019], Retrieved from the internet:<URL: https://lkml.org/lkml/2009/3/13/456> (Year: 2009).*

Edit on GitHub, OPENCL Programming Guide, Mar. 2017, [Retrieved on Mar. 20, 2019], Retrieved from the internet: <URL: https://web.archive.org/web/20180305154943/https://rocm-documentation.readthedocs.io/en/latest/Programming_Guides/Opencl-programming-guide.html> (Year: 2017).*

* cited by examiner

```
struct page { unsigned long flags;

union{
        struct address space *mapping;

void *s_mem:
        atomic t compound mapcount;

};

union {
        pgoff t index;
        void *freelist;

};

union {
|#if defined(CONFIG_HAVE_CMPXCHG_DOUBLE) && \
        defined(CONFIG_HAVE_ALIGNED_STRUCT_PAGE)

unsigned long counters;
else unsigned counters;
endif
```

FIG. 6A

```
struct {
    union { atomic t _mapcount;

unsigned int active;
        struct {
            unsigned inuse:16;
            unsigned objects:15;
            unsigned frozen:1;
        };
        int units;
    };

atomic t _refcount;
  };
};
```

FIG. 6B

```
union {
    struct list_head lru;

struct dev_pagemap * pgmap;

struct {
        struct page *next;
#ifdef CONFIG_64BIT
        int pages;
        int pobjects;
#else
        short int pages;
        short int pobjects;
#endif
    };
    struct rcu_head rcu_head;

struct {
        unsigned long compound_head;

ifdef CONFIG_64BIT unsigned int compound_dtor;
        unsigned int compound_order;
#else
        unsigned short int compound_dtor;
        unsigned short int compound_order;
#endif
    };
```

FIG. 6C

```
#if defined(CONFIG_TRANSPARENT_HUGEPAGE) && USE SPLIT PMD PTLOCKS
        struct {
                unsigned long __pad;

pgtable t pmd huge pte;
            };
#endif
    };

union {
            unsigned long private;

# if USE SPLIT PTE PTLOCKS
# if ALLOC SPLIT PTLOCKS
                spinlock t *ptl;
#else
                spinlock t *ptl;
#endif
#endif
                struck kmem cache *slab_cache;
        };
#ifdef CONFIG_MEMCS
        struct mem cgroup *mem cgroup;
endif if defined(WANT PAGE VIRTUAL)
        void *virtual;

#endif
```

FIG. 6D

```
ifdef CONFIG_KMEMCHECK void *shadow;
endif ifdef LAST_CPUPID_NOT_IN_PAGE_FLAGS
        int_last_cpupid;
    #endif
    } ifdef CONFIG_HAVE_ALIGNED_STRUCT_PAGE
        __aligned(2 * sizeof(unsigned long))
    #endif
    ;
```

FIG. 6E

DIRECT MEMORY ACCESS FOR CO-PROCESSOR MEMORY

CROSS-REFERENCE TO RELATED APPLICATION

This application claims priority to U.S. Provisional Application 62/527,902, filed on Jun. 30, 2017, the entire content of which is incorporated by reference.

TECHNICAL FIELD

This subject matter is generally related to direct memory access for co-processor memory.

BACKGROUND

Co-processors include, e.g., general-purpose graphics processing units (GPGPUs), which are graphics processing units that process data for graphics rendering and also perform non-specialized calculations typically performed by central processing units (CPUs). A graphics processing unit can have many processing cores that process image and graphical data faster than a traditional central processing unit. Migrating data into graphical form and using the graphics processing unit to process the data can result in significant performance improvement. General-purpose graphics processing units have been applied to process large amounts of data used for artificial intelligence applications and complex simulations. Multiple general-purpose graphics processing units can be used in parallel to further increase performance.

In some examples, a computing system can include a central processing unit (CPU), a general-purpose graphics processing unit (GPGPU), system memory or CPU memory associated with the CPU, GPU memory associated with the GPU, a chipset, and a non-volatile storage device (e.g., a solid state drive, SSD) that stores data and program code. The non-volatile storage device and other peripheral devices can be connected to a peripheral component interconnect express (PCIe) bus. The chipset can include a PCIe controller and/or a PCIe switch that controls the transfer of data from the non-volatile storage device and the other peripheral devices to the central processing unit through the PCIe bus, and vice versa. When the general-purpose graphics processing unit needs to access the data stored in the non-volatile storage device, the central processing unit retrieves the data from the non-volatile storage device and stores the data in the CPU memory. The graphics processing unit reads the data from the CPU memory and stores the data in the GPU memory. When data in the GPU memory needs to be written to the non-volatile storage device, the general-purpose graphics processing unit reads the data from the GPU memory and writes the data to the CPU memory. The central processing unit reads the data from the CPU memory and writes the data to the non-volatile storage device.

SUMMARY

In general, in one aspect, a method for processing data in a computing system is provided. The computing system includes a central processing unit, CPU memory associated with the central processing unit, a graphics processing unit, GPU memory associated with the graphics processing unit, a data bus, and a storage device electrically coupled to the data bus. A first portion of the CPU memory is allocated as user space and a second portion of the CPU memory is allocated as kernel space, the user space is configured for use by user applications, and the kernel space is configured for use by operating system kernel applications. The method includes, at the central processing unit, for each of a plurality of regions of GPU physical memory, generating a data structure representing the GPU physical memory region and having information about the GPU physical memory region, the information including the status of the GPU physical memory region, and storing the data structure in the kernel space. The data structure has a format that is consistent with a format used by an operating system of the computing system for representing a region of physical memory. The method includes allocating a first GPU virtual memory space for a user-space process, and at the graphics processing unit, mapping the first GPU virtual memory space to a first GPU physical memory space. The method includes, based on the data structure representing the GPU physical memory region, mapping the first GPU physical memory space to a CPU virtual address associated with the user-space process; initiating a direct input/output operation using the CPU virtual address that is mapped to the first GPU physical memory space; generating a bus address based on the data structure corresponding to the CPU virtual address; and initiating a direct memory access (DMA) operation based on the bus address to transfer data between the storage device and the first GPU physical memory space through the data bus.

In general, in another aspect, a computing system is provided. The computing system includes a central processing unit (CPU) and a CPU memory associated with the central processing unit, in which a first portion of the CPU memory is configured to be allocated as user space and a second portion of the CPU memory is configured to be allocated as kernel space, the user space is configured for use by user applications, and the kernel space is configured for use by operating system kernel applications. The computing system includes a general purpose graphics processing unit having a plurality of processing cores; GPU memory associated with the graphics processing unit; a data bus; and a storage device electrically coupled to the data bus. The central processing unit, the graphics processing unit, and the storage device are configured to: execute a user-space process; and for each of a plurality of regions of GPU physical memory, generate a data structure representing the GPU physical memory region and having information about the GPU physical memory region, the information including the status of the GPU physical memory region, and store the data structure in the kernel space, in which the data structure has a format that is consistent with a format used by an operating system of the computing system for representing a region of physical memory. The central processing unit, the graphics processing unit, and the storage device are configured to: allocate a first GPU virtual memory space for the user-space process; map the first GUP virtual memory space to a first GPU physical memory space; based on the data structure representing the GPU physical memory region, map the first GPU physical memory space to a CPU virtual address associated with the user-space process; initiate a direct input/output operation using the CPU virtual address that is mapped to the first GPU physical memory space; generate a bus address based on the data structure corresponding to the CPU virtual address; and initiate a direct memory access (DMA) operation based on the bus address to transfer data between the storage device and the first GPU physical memory space through the data bus.

In general, in another aspect, a vehicle having data processing capabilities is provided. The vehicle includes a central processing unit (CPU); and a CPU memory associated with the central processing unit, in which a first portion of the CPU memory is configured to be allocated as user space and a second portion of the CPU memory is configured to be allocated as kernel space, the user space is configured for use by applications for controlling the vehicle, and the kernel space is configured for use by operating system kernel applications. The vehicle includes at least one general purpose graphics processing unit, each graphics processing unit having a plurality of processing cores and associated GPU memory; a data bus; and a storage device electrically coupled to the data bus, the storage device storing data useful for controlling the vehicle. The central processing unit, the graphics processing unit, and the storage device are configured to: execute a vehicle application in the user space of the CPU memory, and for each of a plurality of regions of GPU physical memory, generate a data structure representing the GPU physical memory region and having information about the GPU physical memory region, the information including the status of the GPU physical memory region, and store the data structure in the kernel space, in which the data structure has a format that is consistent with a format used by an operating system of the vehicle for representing a region of physical memory. The central processing unit, the graphics processing unit, and the storage device are configured to: allocate a first GPU virtual memory space for a user-space process; and map the first GPU virtual memory space to a first GPU physical memory space. The central processing unit, the graphics processing unit, and the storage device are configured to: based on the data structure representing the GPU physical memory region, map the first GPU physical memory space to a CPU virtual address associated with the user process, initiate a direct input/output operation using the CPU virtual address that is mapped to the first GPU physical memory space, generate a bus address based on the data structure corresponding to the CPU virtual address, initiate a direct memory access (DMA) operation based on the bus address to transfer data between the storage device and the first GPU physical memory space through the data bus, use the graphics processing unit to process the data to generate an output, and use the output generated by the graphics processing unit to control an operation of the vehicle.

In general, in another aspect, a computer readable medium storing computer executable instructions is provided. The executable instructions are configured such that, these instructions, when executed by a computing system that includes a central processing unit, CPU memory associated with the central processing unit, a graphics processing unit, GPU memory associated with the graphics processing unit, a data bus, and a storage device electrically coupled to the data bus, in which a first portion of the CPU memory is allocated as user space and a second portion of the CPU memory is allocated as kernel space, the user space is configured for use by user applications, and the kernel space is configured for use by operating system kernel applications, cause the computing system to perform: at the central processing unit, for each of a plurality of regions of GPU physical memory, generating a data structure representing the GPU physical memory region and having information about the GPU physical memory region, the information including the status of the GPU physical memory region, and storing the data structure in the kernel space, in which the data structure has a format that is consistent with a format used by an operating system of the computing system for representing a region of physical memory. The executable instructions are configured such that these instructions, when executed by the computing system, cause the computing system to perform: allocating a first GPU virtual memory space for a user-space process; at the graphics processing unit, mapping the first GPU virtual memory space to a first GPU physical memory space; based on the data structure representing the first GPU physical memory region, mapping the first physical GPU memory space to a CPU virtual address associated with the user-space process; initiating a direct input/output operation using the CPU virtual address that is mapped to the first GPU physical memory space; generating a bus address based on the data structure corresponding to the CPU virtual address; and initiating a direct memory access (DMA) operation based on the bus address to transfer data between the storage device and the first GPU physical memory space through the data bus.

The details of one or more of the above aspects and implementations are set forth in the accompanying drawings and the description below. Other features, aspects, and advantages will become apparent from the description, the drawings, and the claims.

BRIEF DESCRIPTION OF DRAWINGS

FIGS. 6A to 6E show an example of a struct page definition.

Like reference symbols in the various drawings indicate like elements.

DETAILED DESCRIPTION

This disclosure describes a novel computing system that enables direct memory access for both central processing unit memory and graphics processing unit memory. In a computing system that has operating system calls and device driver functions to enable direct memory access transfer of data between peripheral devices and the CPU memory, data structures are established to enable mapping of bus addresses to physical GPU memory, allowing peripheral devices connected to the bus to be able to transfer data directly from or to the GPU memory without copying the data to or from the CPU memory. For example, for a system that uses the Linux operating system, the "struct page" data structure is used to represent a physical page of memory. A user application executing in the user space of the CPU memory can, via a proper system call, send a struct page data object or data structure that represents a page of the CPU physical memory mapped to the user space, to the device driver of a storage device connected to a PCIe bus to enable the storage device to directly transfer data from or to the CPU memory through the PCIe bus without being processed by the CPU. Struct page data objects or data structures can also be established for pages of the GPU physical memory. When the user application intends to transfer data between the GPU memory and the storage device, the user application, via a proper system call, sends the struct page data object(s) representing the page(s) of the GPU physical memory mapped to the user space, to the storage device driver to enable the storage device to directly transfer data from or to the GPU memory page(s) through the PCIe bus without having the data being processed by the CPU and without having the data copied to the CPU memory.

Figure 1:
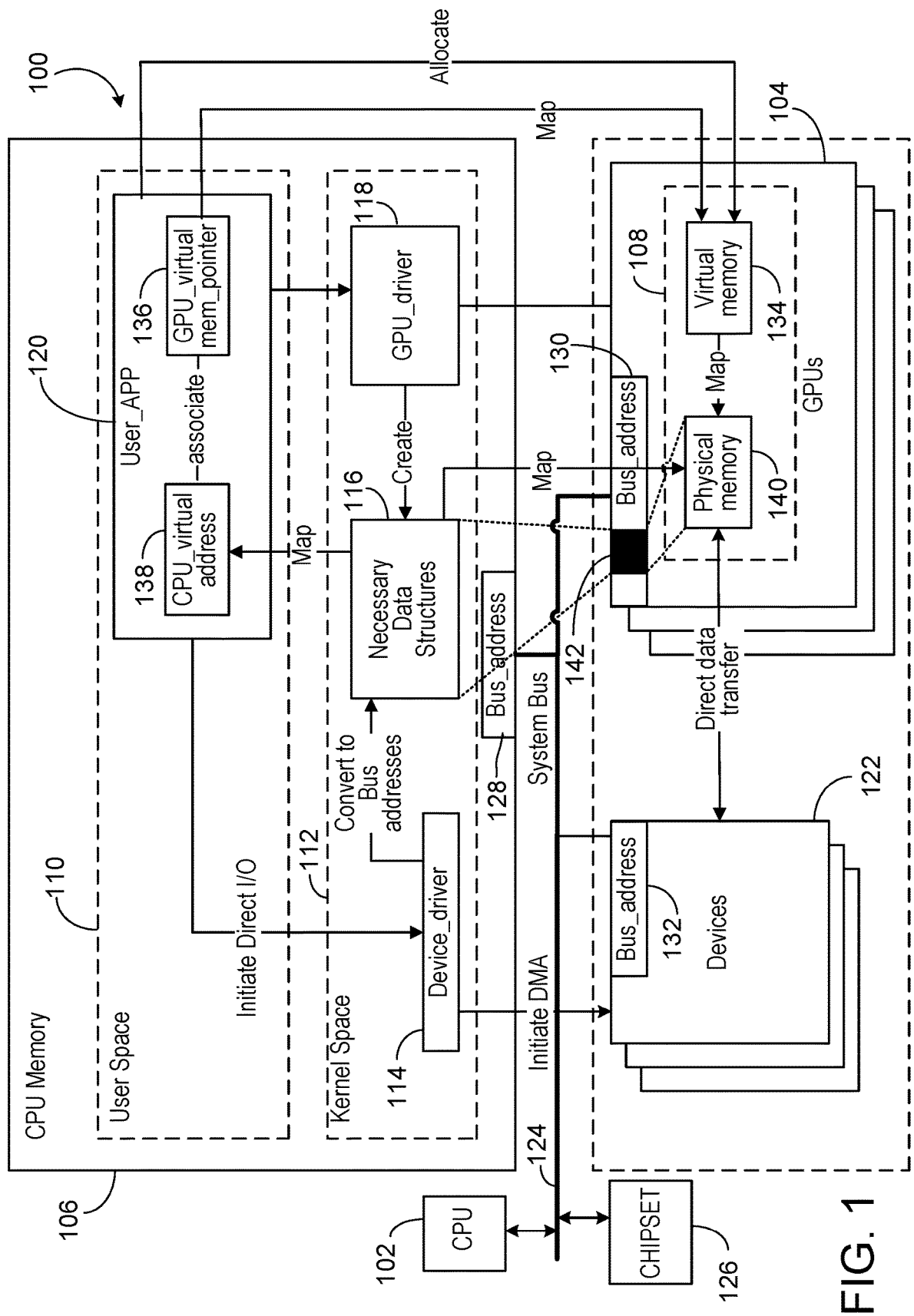
FIG. 1 is a schematic diagram of a computing system.

FIG. 1 is a block diagram of an exemplary computing system 100 that includes a central processing unit (CPU) 102, a plurality of general purpose graphics processing units (GPGPU) 104, and CPU memory 106 associated with the CPU 102. The CPU 102 can be, e.g., Intel® Xeon CPU. Each GPU 104 is associated with GPU memory 108. In some examples, the GPU 104 can be embodied in a semiconductor system-on-a-chip package that includes a GPU chip and one or more memory chips. In some examples, the GPU chip can have built-in memory. In some examples, the GPU 104 and the GPU memory 108 can be mounted on a printed circuit board (e.g., a graphics card), and the GPU memory 108 and the GPU 104 are electrically coupled through a data bus. The figure shows multiple GPUs 104; the invention can also be used in a computing system that has a single GPU 104.

The CPU memory 106 is also referred to as the system memory or host memory, and is configured to store the program instruction or code for the operating system and data used by the operating system. For example, the operating system can be the Linux operating system, Apple® macOS operating system, Apple iOS mobile operating system, Windows® operating system, or Android® operating system. The CPU memory 106 can be divided into user space 110 and kernel space 112. The user space 110 stores user application programs 120, such as video rendering programs, animation rendering programs, image processing programs, machine learning programs, mathematical simulation programs, application programs for controlling vehicles, application programs for controlling robots, big data application programs, application programs for processing financial data, application programs for processing health care data, application programs for processing medical data, and/or application programs having artificial intelligence capabilities.

The kernel space 112 is configured to store operating system kernel programs and associated data, such as the operating system, system call interfaces, application program interfaces, device drivers 114, a file system, data structures 116, and a GPU driver 118. The GPU driver 118 enables the user application program 120 to access functions of the GPU 104 through, e.g., function calls. For example, the GPU 104 can be compatible with the CUDA® platform developed by NVIDIA®, and the GPU driver 118 can include CUDA drivers that enable access to the functions of the CUDA platform.

The data structures 116 can be used for various purposes. For example, for a computing system that uses the Linux operating system, the system kernel uses a "struct page" data structure or data object to represent each physical page of the CPU memory 106 controlled by the operating system, and to convert addresses among virtual, physical, and bus address spaces. The following describes an exemplary struct page data structure.

For example, in a computing system using Linux operating system, each physical page in the system has a struct page associated with it to keep track of what the page is being used for. For a pagecache page, rmap structures can provide information about which task is mapping the page.

For example, the objects in struct page are organized in double word blocks in order to allow the use of atomic double word operations on portions of struct page. The arrangement allows the use of atomic double word operations on the flags/mapping and lru list pointers.

FIG. 6 shows an exemplary struct page definition. This is merely an example, the struct page can be defined differently depending on operating systems and applications. In the struct page, the "flags" field is used to describe the page's states, statuses, attributes, and/or characteristics. The "refcount" field is used to keep track of the reference count to the page. If the count drops to 0, the page may be freed. If the count is greater than 0, it means the page is in use by one or more processes or is in use by the kernel such as when waiting for input or output. The "pgmap" field is used to keep track of the usage of the device memory (e.g., GPU memory). The "flags," "refcount," and "pgmap" fields are used when generating the struct page data structure. These fields can be modified using the Linux kernel application programming interface (API). The struct page can be generated using the Linux kernel API. When a struct page data structure has been generated, the location of the struct page within a memory mapping table can be used as a basis for converting between the physical address and the bus address. The "flags," "refcount," and "pgmap" fields are used by the operating system, such as the system kernel, file system, and device driver.

The computing system 100 can include peripheral devices 122, such as storage devices, signal processing cards, audio processing cards, video processing cards, signal encoder/decoder cards, digital-to-analog signal processing cards, analog-to-digital signal processing cards, controller cards for controlling vehicles, and/or controller cards for controlling robots. For example, the peripheral device 122 can be a non-volatile storage device, such as a solid state drive (SSD) that uses flash memory. The non-volatile storage device can be compatible with the non-volatile memory express (NVMe) specification. The peripheral devices 122 can be electrically coupled to a system bus 124, such as a peripheral component interconnection express (PCIe) bus or an NVIDIA NVLink bus. The CPU 102 and the CPU memory 106 are also electrically coupled to the system bus 124.

Each peripheral device 122 can have a corresponding device driver 114 stored in the kernel space 112 of the CPU memory 110. The device driver 114 enables the operating system or the user application 120 to access the functions of the peripheral device 122, e.g., by using function calls. For example, the device driver 114 can provide functions calls for performing direct memory access (DMA) transfer of data from the corresponding peripheral device to memory.

In some examples, the computing system 100 includes a chipset 126 for managing the data flow between the CPU 102, the GPU 104, the CPU memory 106, the GPU memory 104, and the peripheral devices 122. In some examples, the chipset 126 can include a northbridge and a southbridge. The northbridge links the CPU 102 to higher-speed devices, e.g., the CPU memory 106, the GPU 104, and the GPU memory 108. The southbridge connects the CPU 102 to lower-speed peripheral devices, such as keyboards, computer mice, and printers. In some examples, the chipset 126 or portions of the chipset can be integrated into the CPU 102. For example, the CPU 102 can include a memory controller for controlling access to memory. The CPU 102 can include an expansion bus (e.g., PCIe) interface controller for controlling interactions with peripheral devices 122 connected to the system bus 124. The CPU 102 can include a video controller for controlling interactions with a display device.

Each device connected to the system bus 124 is allocated a range of addresses. For example, the CPU memory 106 is associated with a first range of bus addresses 128, the GPU memory 108 is associated with a second range of bus addresses 130, and each peripheral device 122 is associated with a fourth range of bus addresses 132. When data is written to a particular bus address, the data will be sent to a particular device associated with the particular bus address. For example, if the particular bus address is within the first range of bus addresses 128, the data will be written to the CPU memory 106. If the particular bus address is within the second range of bus addresses 130, the data will be written to the GPU memory 106. If the particular bus address is within the third range of bus addresses 132, the data will be written to the peripheral device 122.

From the CPU's perspective, each device connected to the system bus 124 is allocated a range of physical addresses, and there exists a mapping between a physical address and a bus address. While the CPU locates other devices connected to the system bus 124 by physical addresses, other devices connected to the system bus 124 locates one another by bus addresses. In some examples, a physical address is converted to a bus address before a device connected to the system bus 124, including the CPU, initiates a direct memory access operation. Such an address conversion may take place in a hardware level, such as IOMMU (input-output memory management unit), or in a software level, such as a device driver. If a physical address and the corresponding bus address are identical, such an address conversion can be omitted.

The following describes a technique for enabling DMA transfer of data from the peripheral device 122 to the GPU memory 108, and vice versa. In order to perform DMA data transfer between the peripheral device 122 and a region of memory, the peripheral device 122 needs to know the bus address that corresponds to the memory region. In some implementations, the Linux operating system kernel uses the struct page data object to represent a physical page of the CPU memory 106. The Linux kernel can send a read request or a write request with at least one struct page data object to the device driver 114 of the peripheral device 122, and the device driver 114 can determine the bus addresses based on the struct page data object. The device driver 114 can send data to or read data from the bus address corresponding to the CPU memory page. In some implementations, neither the Linux kernel nor the GPU driver 118 automatically generates struct page data objects for the GPU memory 108. Thus, using the existing Linux operating system and device drivers, it can be difficult to perform DMA transfer of data between the peripheral device 122 and the GPU memory 108.

In some implementations, in order to enable DMA transfer of data between the peripheral device 122 and the GPU memory 108, data structures 116 can be generated to represent regions of the GPU memory 108 such that the data structures 116 have the same format as the data structures used by the operating system to represent regions of the CPU memory 106. For example, struct page data structures 116 can be established to represent the GPU memory pages 108. The struct page data structures 116 can be provided to the Linux kernel, the Linux kernel can send a read request or a write request with at least one struct page data structure 116 to the device driver 114 of the peripheral device 122, and the device driver 114 can determine the bus addresses of the GPU memory 108 based on the struct page data structure 116. The device driver 114 can send data to or read data from the bus address corresponding to the GPU memory 108.

The GPU memory 108 can have GPU physical memory addresses and GPU virtual memory addresses. The GPU physical memory addresses correspond to the GPU physical memory 140 and the GPU virtual memory addresses correspond to the GPU virtual memory 134. By using GPU virtual memory addresses, the GPU memory 108 as seen by the user application 120 can appear as a contiguous address space or a collection of contiguous segments. The GPU 104 includes a memory management unit (MMU) that translates virtual addresses to physical addresses. In some examples, a GPU virtual address space can exceed the capacity of the GPU physical memory and thus reference more GPU memory than is physically present. The benefits of the GPU virtual memory 134 include freeing the user applications 120 from having to manage the details of the GPU memory space that can be shared among several user applications 120.

In order for the peripheral device 122 to transfer data to or receive data from the GPU memory 108, the peripheral device 122 needs to write data to or read data from the bus addresses of the GPU physical memory 140 (thus avoiding the need to translate virtual memory addresses to physical memory addresses, which takes time and slows down the transfer of data). The peripheral device 122 can write data to or read data from the bus addresses of the GPU physical memory 108 if the peripheral device 122 knows the bus addresses that correspond to the GPU physical memory addresses. The data structure 116 provides information about the GPU physical memory 140. Based on the data structure 116, the device driver 114 of the peripheral device 122 can determine the bus address that correspond to the physical address of the GPU memory 108.

In some implementations, in order to generate the data structure 116 for a region of GPU physical 140 memory, the user application 120 can invoke a first function call of the GPU 104 to request allocation of a region of GPU virtual memory 134. The first function call returns to the user application 120 a pointer 136 to the allocated region of the GPU virtual memory 134. The user application 120 can invoke a second function call of the GPU 104 to request that the allocated region of GPU virtual memory 134 be mapped to a region of GPU physical memory 140. The second function call returns to the user application 120 a GPU memory mapping handle which represents the mapping between the GPU virtual memory 134 and the GPU physical memory 140. The user application 120 can then invoke and pass the GPU memory mapping handle to a third function call of the GPU 104 to request mapping of the GPU physical memory 140 to the CPU virtual memory space associated with the user application 120. The GPU virtual memory address pointer 136 is associated with a CPU virtual address 138 returned to the user application 120 by the third function call. Based on the GPU memory mapping handle, the data structure 116 can be established and used to map the CPU virtual address 138 to the GPU physical memory region 140.

The user-space application 120 initiates direct input/output operations using the CPU virtual address 138 associated with the GPU physical address 140. The operating system kernel sends the data structure 116 associated with the CPU virtual address 138 to the device driver 114 associated with the peripheral device 122. The peripheral device 122 determines the bus address of the GPU memory 108 based on the data structure 116. The peripheral device 122 initiates DMA transfer of data with the GPU memory 108 based on the bus address of the GPU memory 108.

Figure 2:
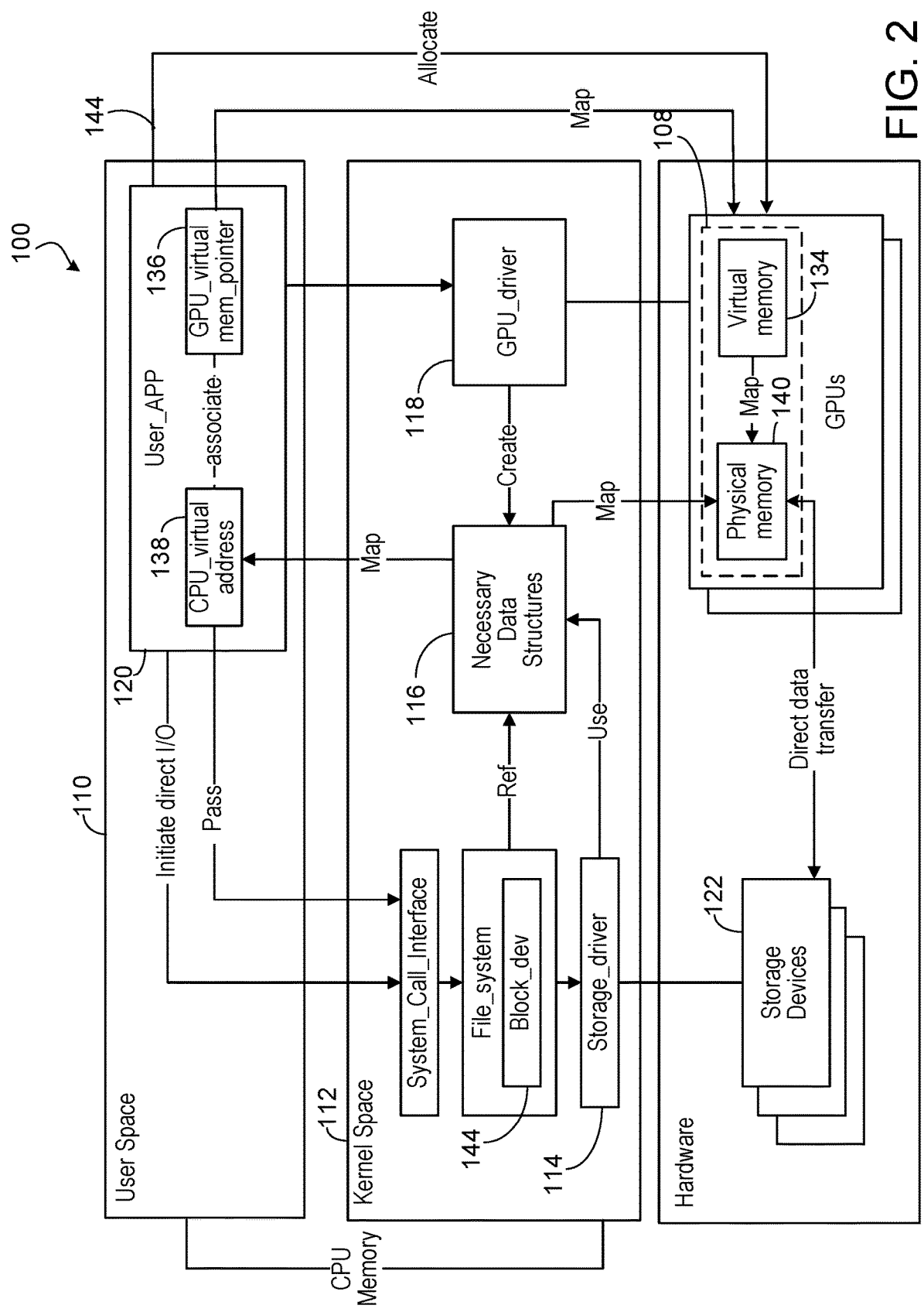
FIG. 2 is an operational diagram of the computing system.
Figure 3A:
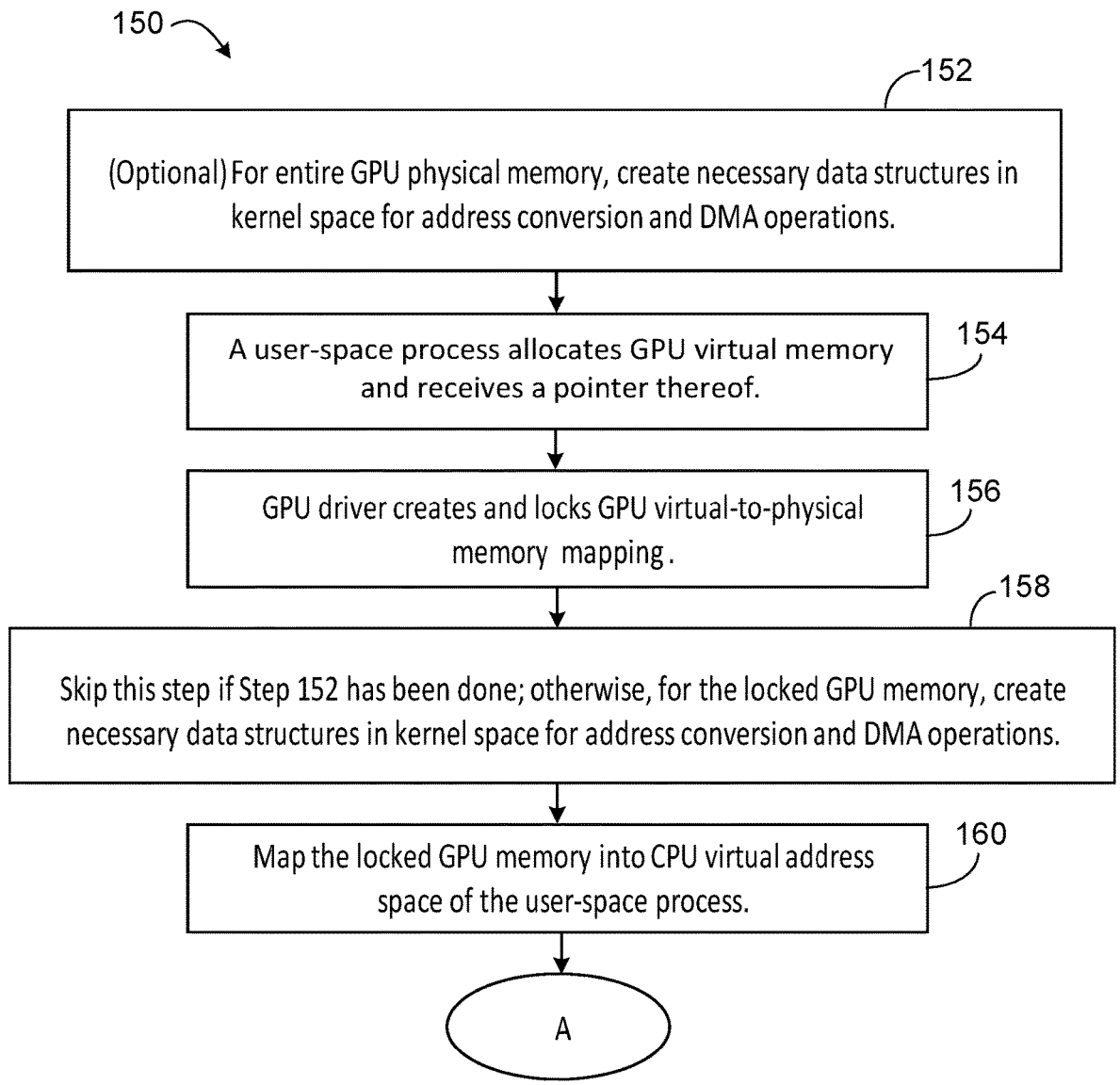
FIGS. 3A, 3B, 4A to 4C, and 5A to 5C are flow diagrams of processes for implementing direct memory access (DMA) transfer of data in the computing system.
Figure 3B:
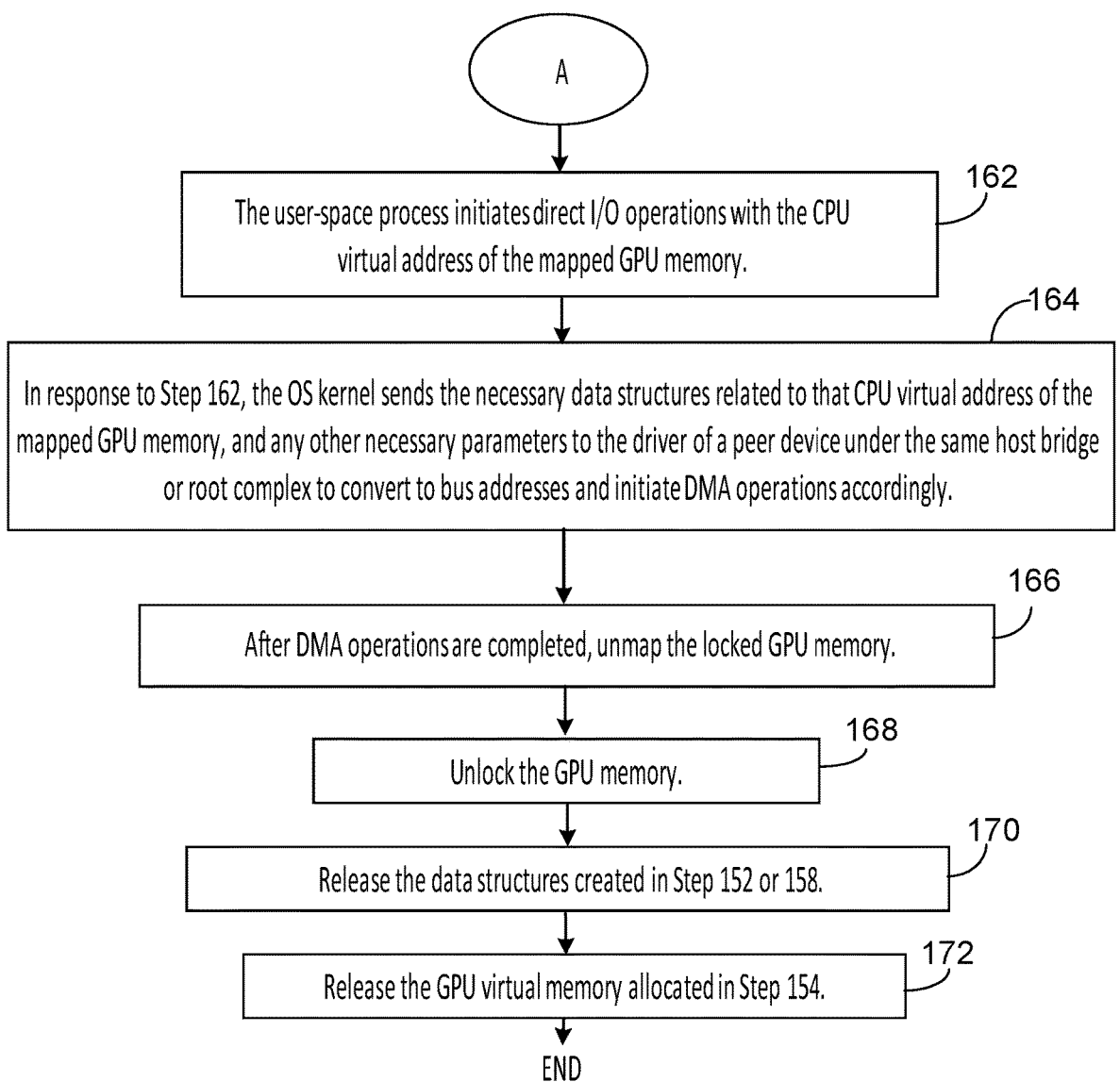

The following describes a generalized exemplary process for establishing the data structure useful for enabling DMA data transfer between the peripheral device 122 and the GPU memory 108. Referring to FIGS. 2, 3A, and 3B, a process 150 is provided for enabling DMA data transfer between the peripheral device 122 and the GPU memory 108. FIG. 2 shows the interactions, function calls, and/or signal paths between modules of the system 100 that correspond to the steps of the process 150 shown in FIGS. 3A and 3B.

The process 150 can include the following exemplary steps.

Step 152: Optionally, for the entire GPU physical memory 108, the GPU driver 118 or a kernel module generates necessary data structures 116 in kernel space 112 to facilitate address conversion and DMA operations. This step is optional because in some implementations, the necessary data structures 116 can be generated in a later step.

Steps 154: A user-space process or application 120 allocates GPU virtual memory 134 and receives a pointer 136 to the GPU virtual memory 134. The user-space process 120 can include, e.g., a video rendering program, an animation rendering program, an image processing program, a machine learning program, a mathematical simulation program, an application program for controlling a vehicle (e.g., an electric bicycle, a motorcycle, a personal transportation vehicle, a car, a truck, a train, a ship, a train, or an airplane), an application program for controlling a robot, an application program for controlling a household appliance, an application program for controlling an industrial machine, a big data application program, an application program for processing financial data, an application program for processing health care data, an application program for processing medical data, and/or an application program having artificial intelligence capabilities.

Step 156: The GPU driver 118 maps the allocated GPU virtual memory 134 to a region of the GPU physical memory 140, and locks the mapping between the GPU virtual memory 134 and the GPU physical memory 140. The term "locking" refers to maintaining the mapping between the allocated GPU virtual memory 134 and the GPU physical memory 140 until the user application 120 issues an instruction to unlock or release the mapping. Thus, when the mapping between the allocated GPU virtual memory 134 and a region of the GPU physical memory 140 is locked, the region of the GPU physical memory 140 cannot be mapped to another virtual memory until the mapping is unlocked or released.

If the mapping between the allocated GPU virtual memory 134 and the corresponding region of the GPU physical memory 140 is not locked, it is possible that the GPU 104 can map another region of the GPU physical memory 140 to the allocated GPU virtual memory 134 when, e.g., the user application 120 or another application requests additional GPU virtual memory such that there is not sufficient GPU physical memory 140 to map to the GPU virtual memory 134. In some examples, the GPU 104 can copy data from a portion of the GPU physical memory 140 to an external storage device, and map a portion of the GPU virtual address to the address associated with the data stored at the storage device. Locking the mapping between the GPU virtual memory 134 and the GPU physical memory 140 ensures that the GPU virtual memory pointer 136 will consistently map to the same region in the GPU physical memory 140.

Step 158: If step 152 is not performed, for the locked GPU memory 108, the GPU driver 118 or a kernel module generates the data structure 116 in kernel space 112 useful for address conversion and DMA operations. If step 152 is performed such that the data structure 116 has already been generated, step 158 can be skipped.

Step 160: The GPU driver 118 or a kernel module maps the locked GPU memory 108 to the CPU virtual address 138 of the user application 120. This way, the CPU virtual address 138 of the user-space application 120 is linked to the GPU memory 108 that has been allocated to the user-space application 120 in step 154.

Step 162: The user-space process 120 initiates direct input/output operations with the CPU virtual address 138 that is mapped to the allocated GPU memory 108.

Step 164: In response to the direct input/output operations in step 162, the operating system kernel (residing in kernel space 112) sends the data structures 116 related to the CPU virtual address 138 that is mapped to the allocated GPU memory 108, and other parameters to the device driver 114 of the peripheral device 122. In this example, the peripheral device 122 is under the same host bridge or root complex as the GPU 104. The device driver 114 generates bus addresses 142 based on the data structures 116 and initiates DMA operations accordingly.

Step 166: After the DMA operations are completed, the GPU driver 118 or a kernel module un-maps the locked GPU memory 108, so that the CPU virtual address 138 is no longer mapped to the locked GPU memory 108.

Step 168: The GPU driver 118 un-locks the GPU memory 108.

Step 170: The GPU driver 118 or a kernel module releases the data structures 116 that are generated in step 152 or 158.

Step 172: The user-space process releases the GPU virtual memory 108 allocated in step 154. The process 150 ends after step 172.

The following describes an exemplary process for enabling DMA data transfer between the peripheral device 122 and the GPU memory 108 of an NVIDIA GPU 104, available from NVIDIA Corporation, Santa Clara, Calif. In this example, the operating system is Linux. The user application 120 is compatible with the NVIDIA CUDA platform and is sometimes referred to as a CUDA application.

Figure 4A:
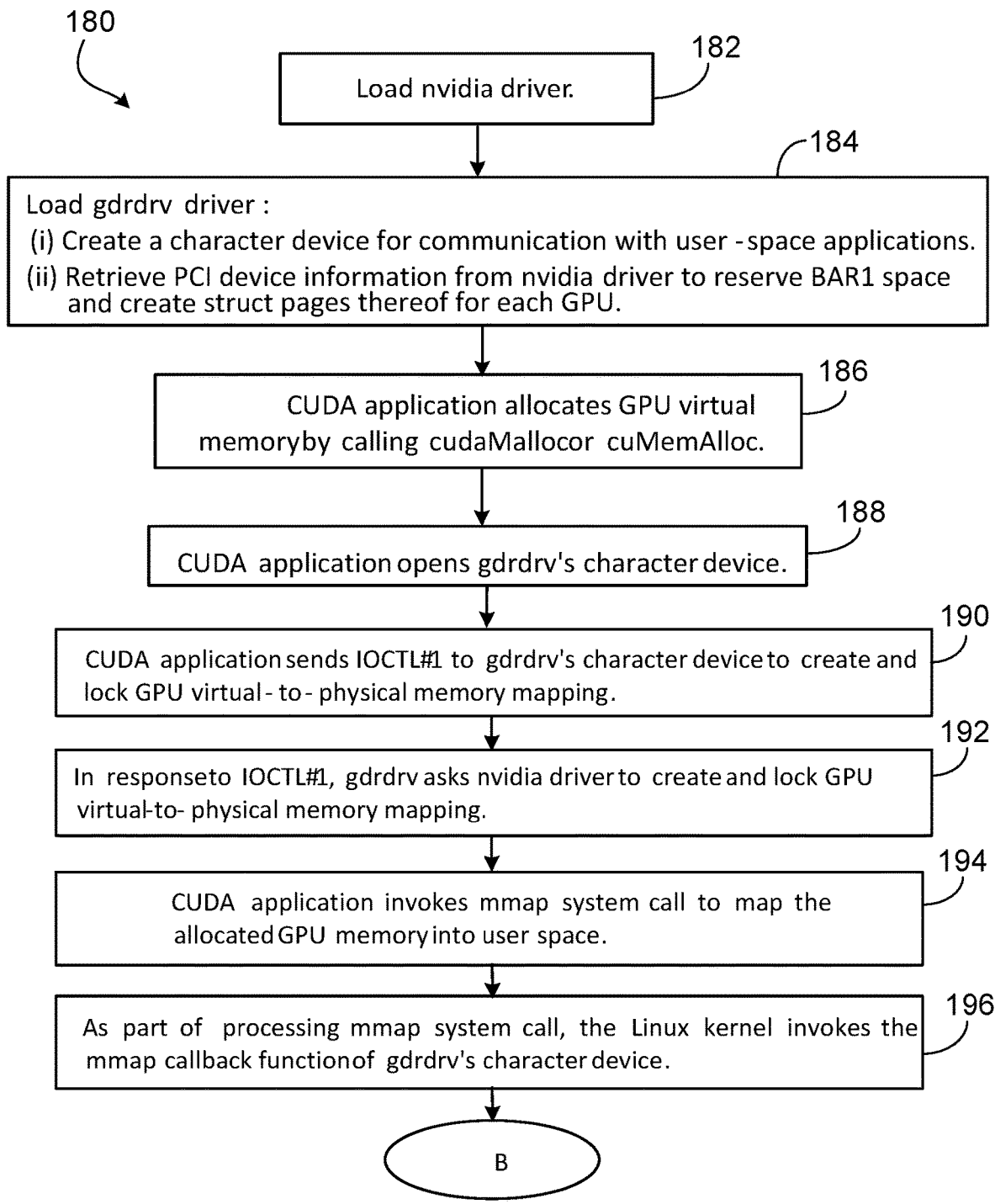
Figure 4B:
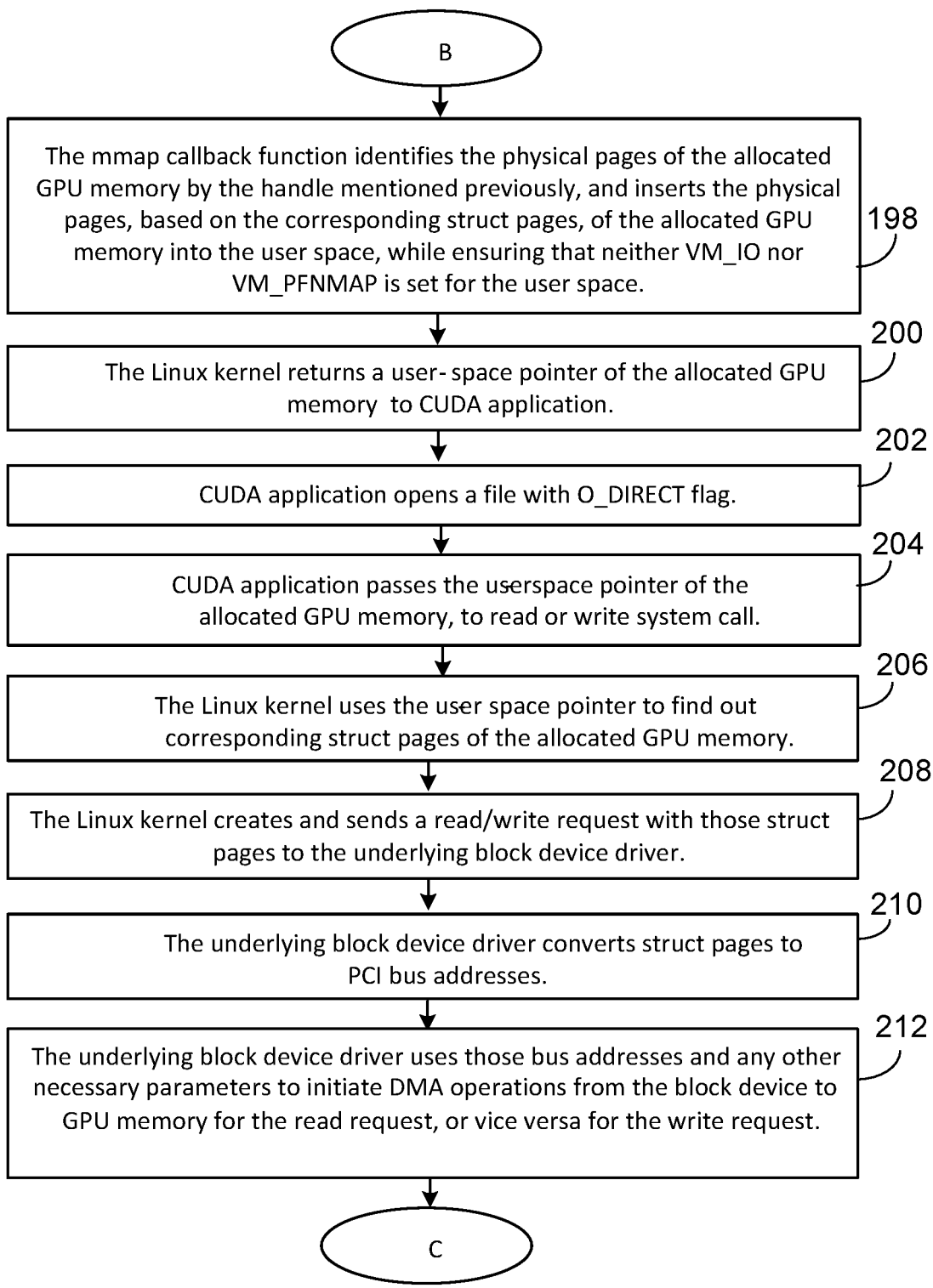
Figure 4C:
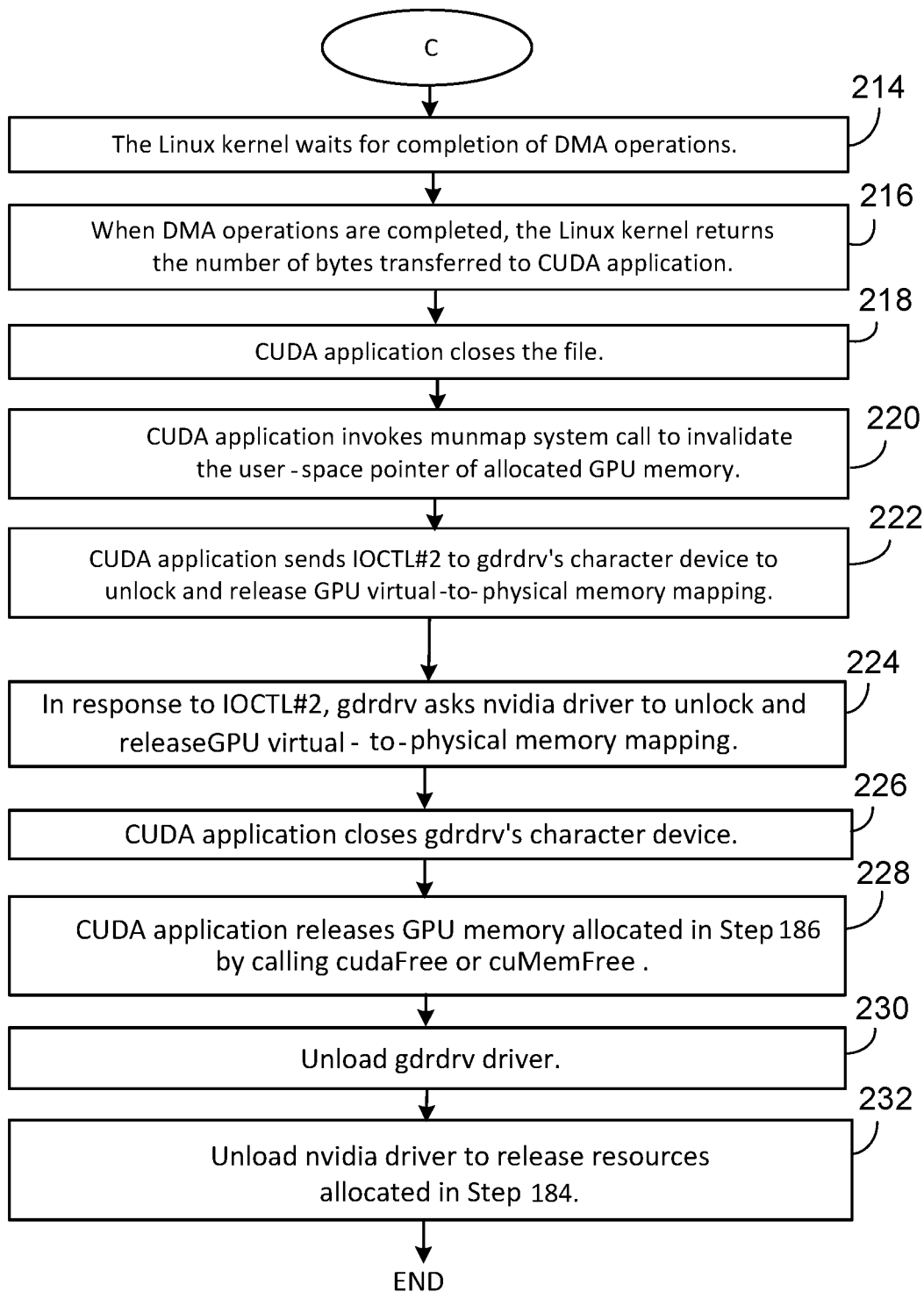
Figure 5A:
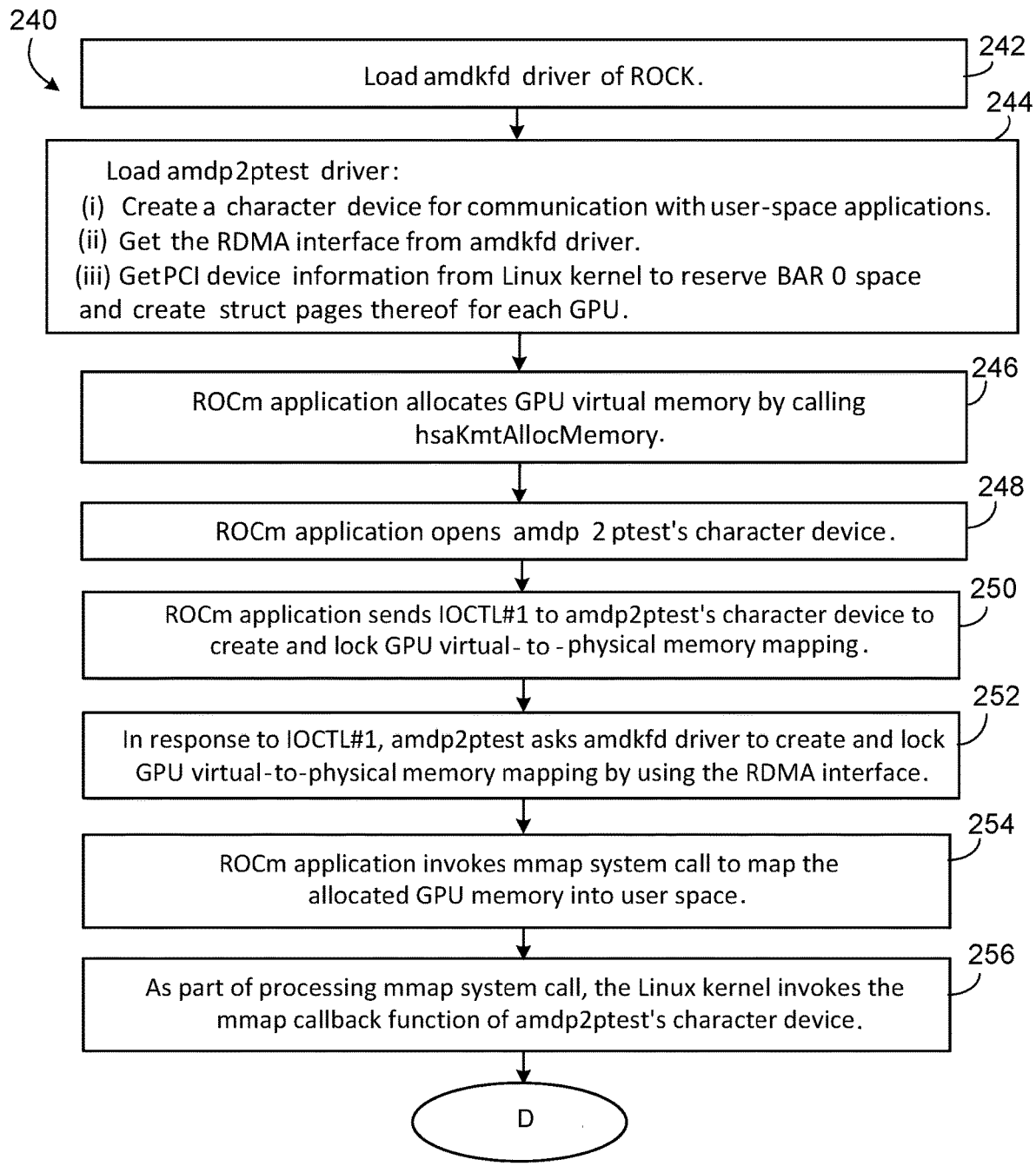
Figure 5B:
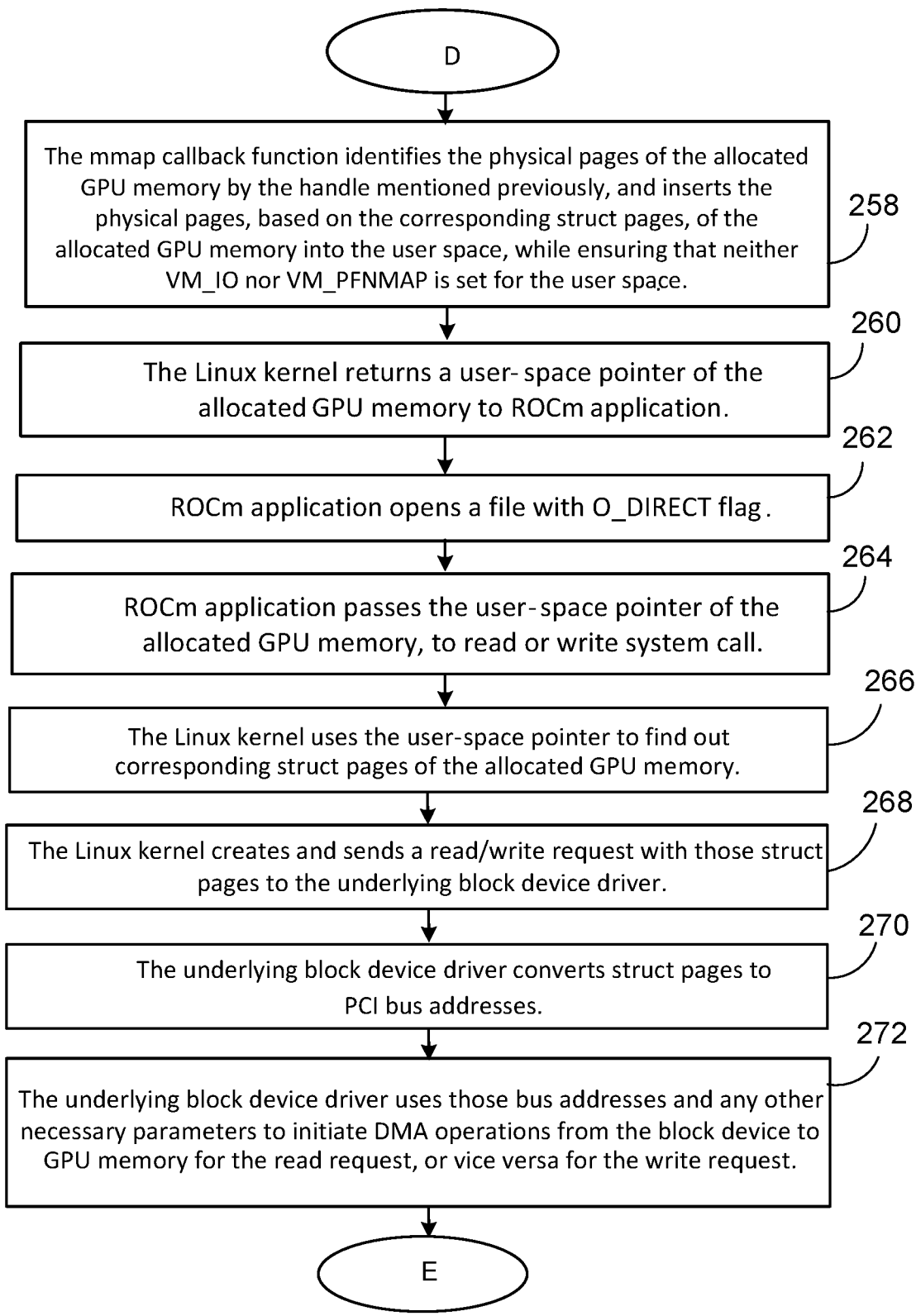
Figure 5C:
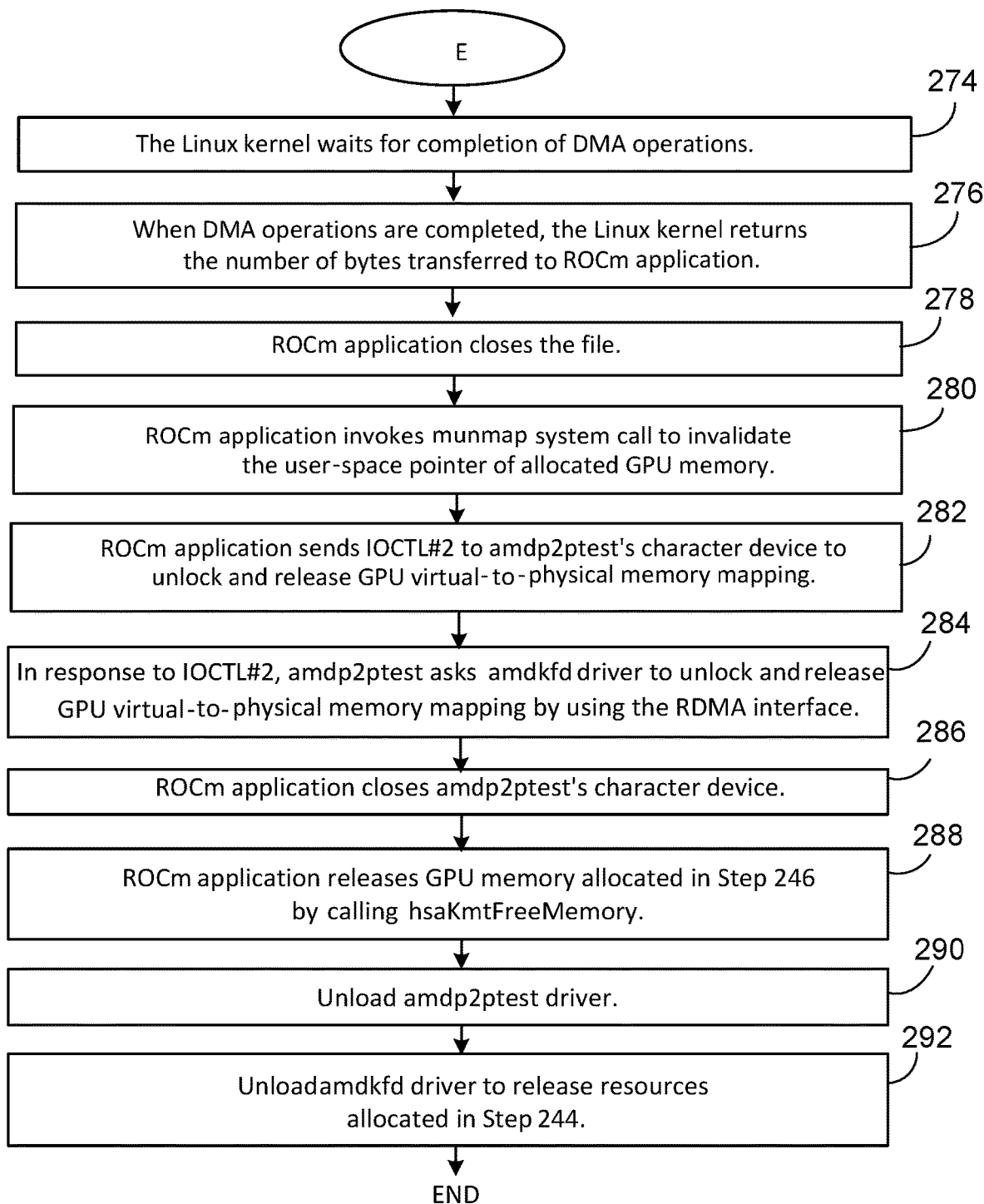

Referring to FIGS. 4A to 4C, a process 180 is provided for enabling DMA data transfer between the peripheral device 122 and the NVIDIA GPU memory 108. The process 180 can include the following exemplary steps.

Step 182: Load an NVIDIA driver (e.g., 118) that provides an interface for accessing the functions of the NVIDIA GPU 104.

Step 184: Load a gdrdrv driver that is useful for generating the struct page data structures used to enable DMA data transfer between the peripheral device 122 and the GPU memory 108. The gdrdrv driver generates a character device for communication with user-space applications (e.g., user-space application 120). For each GPU 104, the gdrdrv driver retrieves PCI device information from the NVIDIA driver to reserve BAR1 (base address register 1) space and generate struct page data structures accordingly, or to make a call to devm_request_mem_region( ), followed by another call to devm_memremap_pages( ).

Step 186: The user application 120 allocates GPU virtual memory, e.g., by calling cudaMalloc or cuMemAlloc functions.

Step 188: The user application 120 opens a gdrdrv driver's character device.

Step 190: The user application 120 sends a first IOCTL command to the gdrdrv's character device to generate and lock a mapping between the GPU virtual memory 134 and the GPU physical memory 140. IOCTL refers to the Linux input/output control system call for device specific input/output operations.

Step 192: In response to the first IOCTL system call, the gdrdrv driver asks the NVIDIA driver to generate and lock the mapping between the GPU virtual memory 134 and the GPU physical memory 108, and returns a handle associated with that mapping.

Step 194: The user application 120 invokes the mmap system call with the handle mentioned above to map the allocated GPU memory into the user space 110.

Step 196: As part of processing the mmap system call, the Linux kernel invokes the mmap callback function of the gdrdrv driver's character device.

Step 198: The mmap callback function identifies the physical pages of the allocated GPU memory by the handle mentioned previously, and inserts the physical pages, based on the corresponding struct pages, of the allocated GPU memory into the user space 110, while ensuring that neither VM_IO nor VM_PFNMAP is set for the user space 110.

Step 200: The Linux kernel returns a user-space pointer 138 of the allocated GPU memory to the user application 120.

Step 202: The user application 120 opens a file with a O_DIRECT flag. The O_DIRECT flag is used in Linux to request the kernel to avoid copying data between user space and kernel space, and instead transfer the data directly between the GPU memory and the storage device, using direct memory access, if possible.

Step 204: The user application 120 passes the user-space pointer 138 of the allocated GPU memory to a read or write system call.

Step 206: The Linux kernel uses the user-space pointer 138 to determine struct page(s) 116 corresponding to the allocated GPU memory 108. Note that the Linux kernel uses the user-space pointer 138 to identify the user-space address area; if VM_IO or VM_PFNMAP of the user-space address area is set, the Linux kernel will not continue to find out the struct page associated, even though it does exist, then the read or write system call will fail. Otherwise, the Linux kernel will look up the page table entries, retrieves the physical addresses, and locate struct pages accordingly based on phys_to_page( ).

Step 208: Linux kernel generates and sends a read request or a write request with the struct page(s) 116 to the underlying block device driver 144 associated with the peripheral device 122.

Step 210: The underlying block device driver 144 generates PCI bus addresses based on the struct page(s) 116.

Step 212: The underlying block device driver 144 uses the bus addresses and any other necessary parameters to initiate DMA operations from the block device (e.g., peripheral device 122) to the GPU memory for the read request, or from the GPU memory to the block device for the write request.

Step 214: The Linux kernel waits for the completion of the DMA operations.

Step 216: When the DMA operations are completed, the Linux kernel returns the number of bytes transferred to the user application 120.

Step 218: The user application 120 closes the file.

Step 220: The user application 120 invokes the munmap system call to invalidate the user-space pointer 138 of the allocated GPU memory 108.

Step 222: The user application 120 sends a second IOCTL command to the gdrdrv driver's character device to unlock and release the mapping between the GPU virtual memory 134 and the GPU physical memory 140.

Step 224: In response to the second IOCTL command, the gdrdrv driver asks the NVIDIA driver to unlock and release the mapping between the GPU virtual memory 134 and the GPU physical memory 140.

Step 226: The user application 120 closes the gdrdrv driver's character device.

Step 228: The user application 120 releases the GPU memory 108 allocated in Step 186 by, e.g., calling the cudaFree or cuMemFree function.

Step 230: Unload the gdrdrv driver.

Step 232: Unload the NVIDIA driver to release resources allocated in Step 184. The process 180 ends after step 232.

The following describes an exemplary process for enabling DMA data transfer between the peripheral device 122 and the GPU memory 108 of an AMD GPU 104, available from Advanced Micro Devices, Inc., Sunnyvale, Calif. In this example, the operating system is Linux. The user application 120 is compatible with the AMD ROCm platform and is sometimes referred to as a ROCm application.

Referring to FIGS. 5A to 5F, a process 240 is provided for enabling DMA data transfer between the peripheral device 122 and the AMD GPU memory 108. The process 240 can include the following exemplary steps.

Step 242: Load the amdkfd driver of ROCK

Step 244: Load an amdp2ptest driver that is useful for generating the struct page data structures used to enable DMA data transfer between the peripheral device 122 and the GPU memory 108. The amdp2ptest driver generates a character device for communication with user-space applications (e.g., user application 120), and obtains the RDMA interface from the amdkfd driver. For each GPU 104, the amdp2ptest driver obtains the PCI device information from the Linux kernel to reserve BAR0 space and generate struct page data structures accordingly, or to make a call to devm_request_mem_region( ), followed by another call to devm_memremap_pages( ).

Step 246: The user application 120 allocates GPU virtual memory 134 by calling the hsaKmtAllocMemory function.

Step 248: The user application 120 opens the amdp2ptest driver's character device.

Step 250: The user application 120 sends a first IOCTL command to the amdp2ptest driver's character device to generate and lock a mapping between the GPU virtual memory 134 and the GPU physical memory 140.

Step 252: In response to the first IOCTL command, the amdp2ptest driver asks the amdkfd driver to generate and lock the mapping between the GPU virtual memory 134 and the GPU physical memory 140 by using the RDMA interface, and returns a handle associated with that mapping.

Step 254: The user application 120 invokes the mmap system call with the handle mentioned above to map the allocated GPU memory 108 into the user space 110.

Step 256: As part of processing the mmap system call, the Linux kernel invokes the mmap callback function of the amdp2ptest driver's character device.

Step 258: The mmap callback function identifies the physical pages of the allocated GPU memory by the handle mentioned previously, and inserts the physical pages, based on the corresponding struct pages, of the allocated GPU memory into the user space 110, while ensuring that neither VM_IO nor VM_PFNMAP is set for the user space 110.

Step 260: The Linux kernel returns a user-space pointer 138 of the allocated GPU memory 108 to the user application 120.

Step 262: The user application 120 opens a file with the O_DIRECT flag.

Step 264: The user application 120 passes the user-space pointer 138 of the allocated GPU memory 108, to a read system call or a write system call.

Step 266: The Linux kernel uses the user-space pointer 138 to determine the corresponding struct pages of the allocated GPU memory 108.

Step 268: The Linux kernel generates and sends a read request or a write request with the struct pages to the underlying block device driver 144. The block device refers to the peripheral device 122.

Step 270: The underlying block device driver determines PCI bus addresses based on the struct pages.

Step 272: The underlying block device driver 144 uses the bus addresses and any other necessary parameters to initiate DMA operations from the block device to the GPU memory 108 for the read request, or from the GPU memory 108 to the block device for the write request.

Step 274: The Linux kernel waits for the completion of the DMA operations.

Step 276: When the DMA operations are completed, the Linux kernel returns the number of bytes transferred to the user application 120.

Step 278: The user application 120 closes the file.

Step 280: The user application 120 invokes the munmap system call to invalidate the user-space pointer 138 of the allocated GPU memory 108.

Step 282: The user application 120 sends a second IOCTL command to the amdp2ptest driver's character device to unlock and release the mapping between the GPU virtual memory 134 and the GPU physical memory 140.

Step 284: In response to the second IOCTL command, the amdp2ptest driver asks the amdkfd driver to unlock and release the mapping between the GPU virtual memory 134 and the GPU physical memory 140 by using the RDMA interface.

Step 286: The user application 120 closes the amdp2ptest driver's character device.

Step 288: The user application 120 releases the GPU memory 108 allocated in Step 246 by calling the hsaKmt-FreeMemory function.

Step 290: Unload the amdp2ptest driver.

Step 292: Unload the amdkfd driver to release resources allocated in Step 244. The process 240 ends after step 292.

The performance of data transfer from the peripheral devices 122 to the GPU memory 108 can be significantly increased using the processes 150, 180, and/or 240 described above, or equivalent processes. For example, a number of performance tests were conducted by transferring data between NVMe solid state drives and NVIDIA Tesla® P100 GPUs. In a first test, data were transferred from a solid state drive to a GPU. When DMA was not used such that the data were transferred from the solid state drive to the host memory (e.g., CPU memory), then transferred from the host memory to the GPU memory, the data rate was about 3598 MB/s. When DMA was used such that the data were transferred directly from the solid state drive to the GPU memory without involving the CPU memory, the data rate was 5921 MB/s, which is significantly higher compared to the data rate without using DMA. In a second test, read operations were performed simultaneously to read a total of 4 GB of data from four NVMe solid state drives to four GPU memories. When DMA was not used, it took 718 ms to read the 4 GB data. When DMA was used, it took 341 ms to read the 4 GB data, which is significantly shorter than the time needed to read the same amount of data when DMA was not used.

Figure 14:
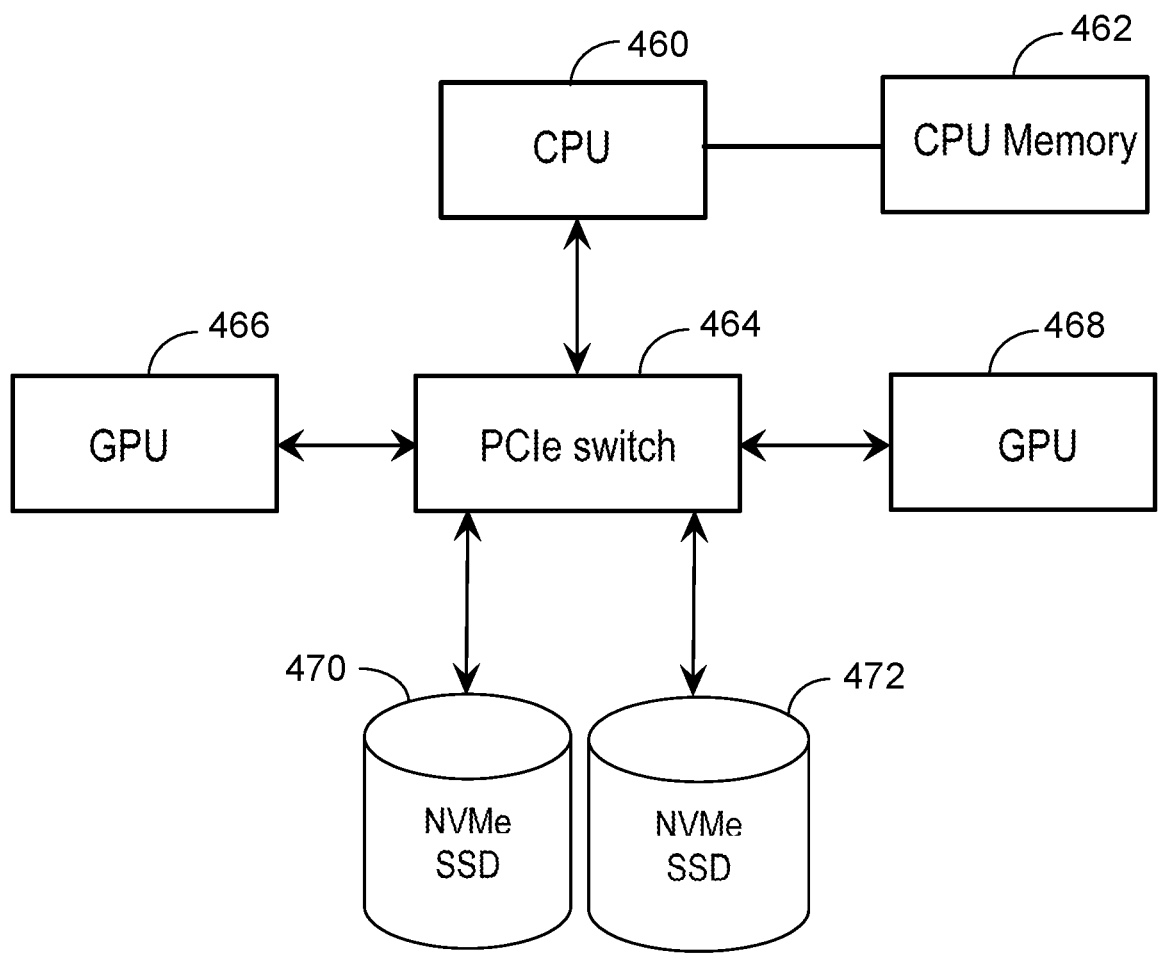
FIG. 14 is a diagram of a hardware setup for testing direct memory access transfer of data.

In a third test, a state-of-the-art, real-time object detection system, YOLO (You Only Look Once), was used to detect objects in 416×416 color images that were transferred using a first batch size of 160 images and a second batch size of 80 images from two NVMe solid state drives to two GPU memories, and in a third batch size of 160 images from one NVMe solid state drive to one GPU memory. For sake of consistency, the images used in the tests are the same: they are color images of a dog and a bicycle. FIG. 14 shows the hardware setup for performing the third test. A CPU 460 is electrically coupled to a CPU memory 462. The CPU 460 is electrically coupled to a PCIe switch 464, which is electrically coupled to a first GPU 466 and a second GPU 468. The PCIe switch 464 is also electrically coupled to a first NVMe solid state drive 470 and a second NVMe solid state drive 472. Every link between the PCIe switch 464 and the other components is a PCIe Gen3×16 bi-directional channel. Moreover, communication between any two endpoints connected to the PCIe switch 464 is fully non-blocking. In this example, the CPU 460 is an Intel Xeon CPU E5-2609 v4 @ 1.70 GHz, the first and second GPUs 466, 468 are NVIDIA Tesla P100 16G, the PCIe switch 464 is Falconwitch PS1816, and the NVMe solid state drives 470, 472 are Intel NVMe P3700 PCIe Gen3×4.

Figure 15:
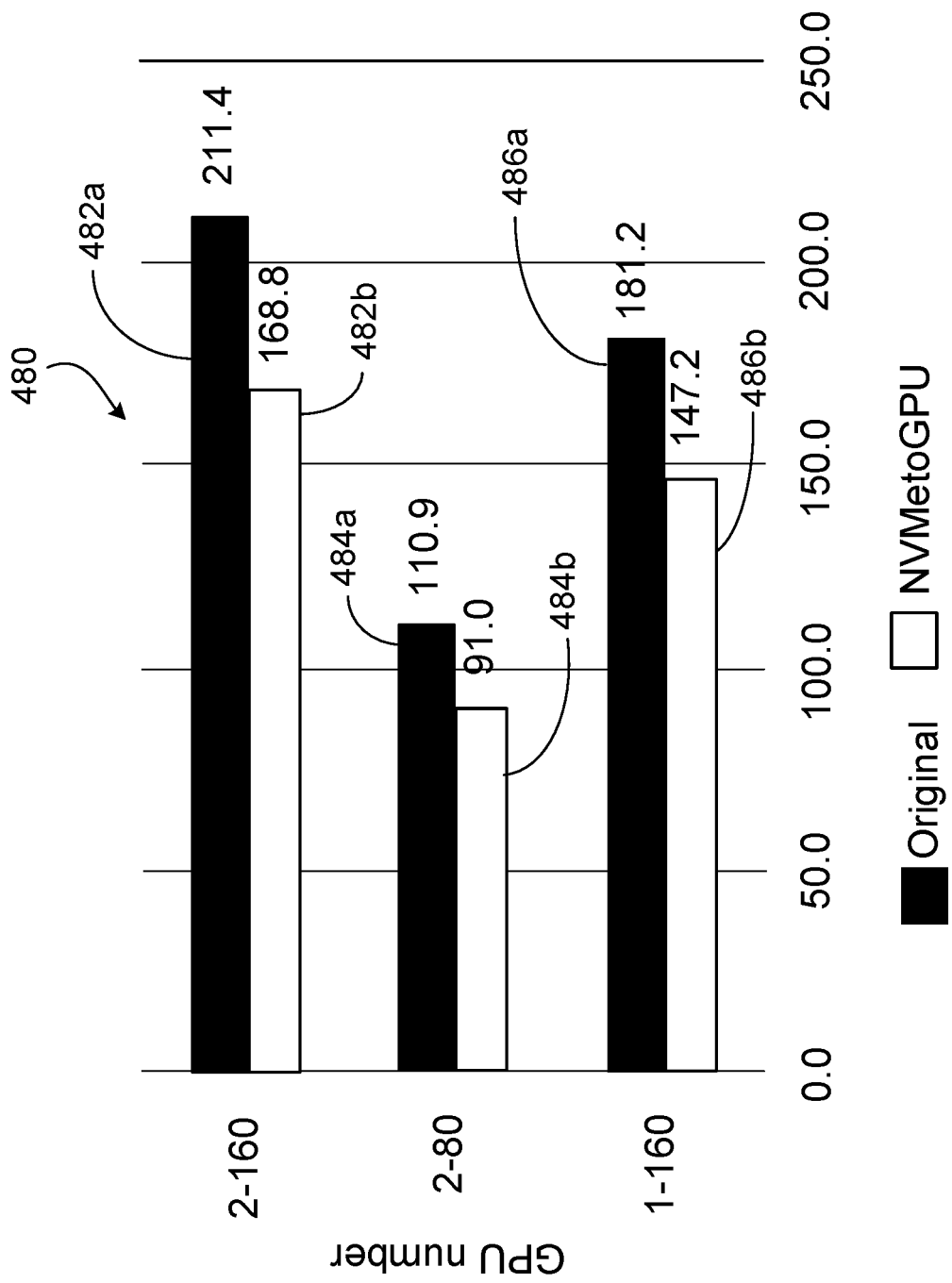
FIGS. 15 and 16 are graphs showing test results of the direct memory access transfer of data.

Referring to FIG. 15, a graph 480 shows that the I/O time of a 1000-iteration test is reduced by 42.6, 19.9, and 34 seconds, or 20.15%, 17.94%, and 18.76% respectively, if images are transferred directly from the NVMe SSDs 470, 472 to the GPU memories 466, 468 without going through the CPU memory 462. In the graph 480, the bars 482a, 484a, and 486a represent test data obtained using the conventional method. The bars 482b, 484b, and 486b represent test data obtained using the DMA transfer technique described above to transfer data from the NVMe SSDs directly to the GPU memories.

Figure 16:
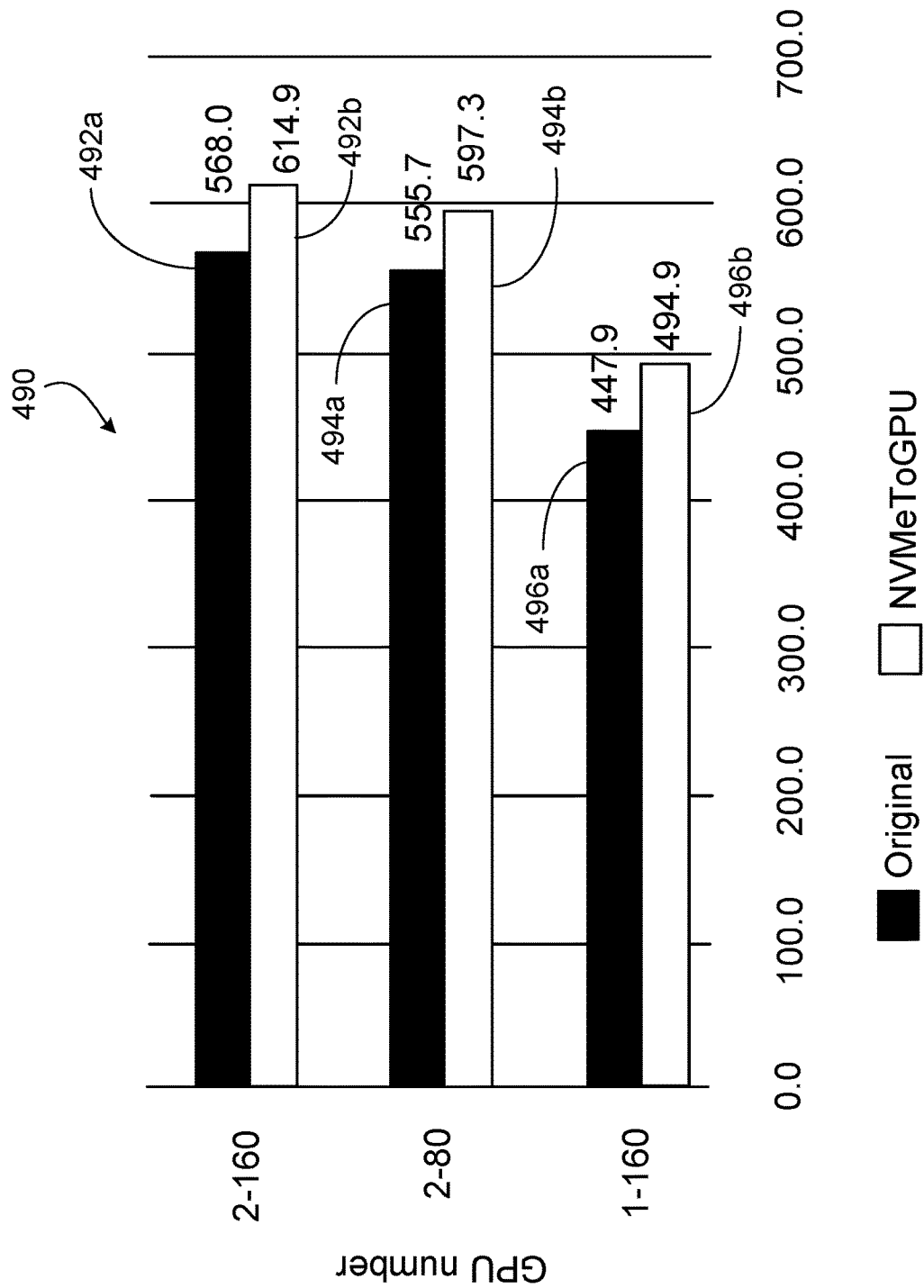

Referring to FIG. 16, a graph 490 shows that the detection speed of a 1000-iteration test is raised by 46.9, 41.6, and 47 images per second, or 8.26%, 7.49%, and 10.49% respectively. In the graph 490, the bars 492a, 494a, and 496a represent test data obtained using the conventional method. The bars 492b, 494b, and 496b represent test data obtained using the DMA transfer technique described above to transfer data from the NVMe SSDs directly to the GPU memories.

Thus, the DMA techniques described above can significantly improve the performance of the computing system and produce tangible results. By enabling data to be transferred faster from a storage device to the GPU memory, the GPU can process vast amounts of data faster, as compared to using computing systems that do not use the DMA techniques described above. The DMA techniques described above can be used in self-driving vehicles that process vast amounts of data, such as image data and other data captured by various sensors of the vehicle. The DMA techniques described above can be used in intelligent robots that process vast amounts of data, such as image data and other data captured by various sensors of the robot. The DMA techniques described above can be used by cloud servers that process vast amounts of financial data, health care data, and/or medical data.

Figure 7:
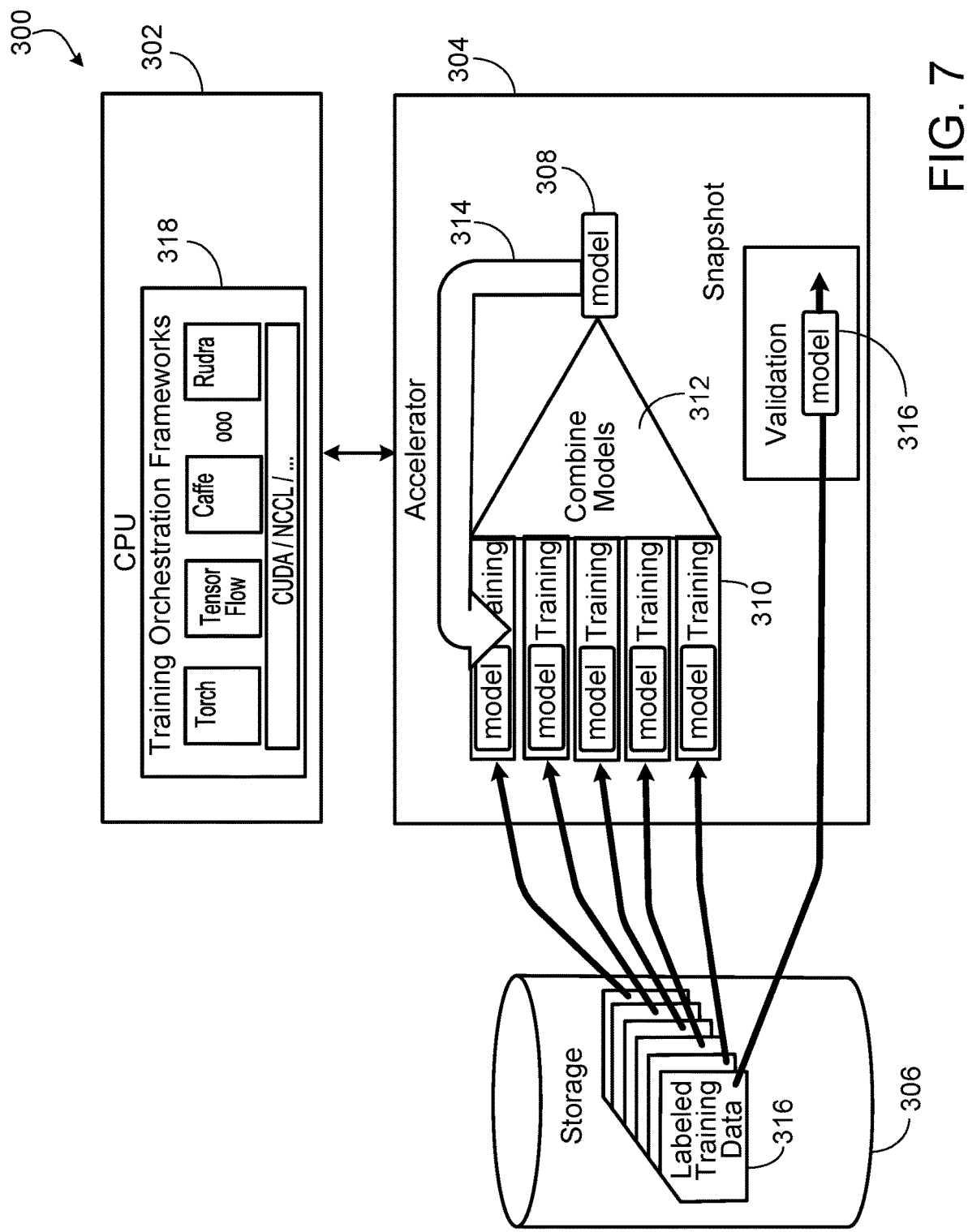
FIG. 7 is a diagram of an exemplary system useful for machine learning applications.

For example, FIG. 7 is a diagram of a computer system 300 that is useful for machine learning applications. The system 300 includes a CPU 302, an accelerator 304, and a storage device 306. The accelerator 304 can include one or more graphics processing units. The bus connections and memory modules are not shown in the figure. In this example, training orchestration frameworks 318 can be executed on the CPU 302, while model training and validation are performed on the accelerator 304. The training orchestration framework 318 can be based on, e.g., Torch, TensorFlow™, Caffe, and/or Rudra. Training data 316 are stored in the storage device 306. By using the DMA techniques described above, the training data 316 can be transferred from the storage device 306 to the memory of the accelerator 304 much faster than conventional methods.

For example, a model can be trained using labeled training data 316 stored on the storage device 306. Several parallel instances of the same model 310 can be trained using different parts of the training data, in which each instance of the model 310 can have its own model parameters. Periodically, the individual model parameters are combined 312 so that information learned from all parts of the training data can be shared among the training modules. The updated model parameters are then broadcast back 314 to the training modules. A validation process 316 is performed to periodically check the accuracy of the latest version of the model to ensure that the model training process is converging. The model training process is stopped when the desired accuracy for the model is achieved.

For example, the models can be used in applications such as fraud detection, e-mail filtering, detection of network intruders, optical character recognition, image recognition, speech recognition, face recognition, product recommendation, medical diagnosis, shape detection, customer segmentation, stock trading recommendation, and computer vision. In many of these applications, the model training requires processing of vast amounts of sample data. As the computation speed of the accelerators (e.g., graphics processing units) become faster, it is important to maintain a high data throughput between the storage device 306 and the accelerator 304 to allow large training data sets to transfer quickly from the storage device 306 to the accelerator 304. The high data throughput can be achieved using the processes (e.g., 150, 180, or 240) described above to enable DMA data transfer between the storage device 306 and the memory of the accelerator 304.

In some implementations, software instructions for implementing the processes 150, 180, and 240 can be provided on computer-readable media (e.g., RAM, ROM, SDRAM, hard disk, optical disk, and flash memory). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or in sequential order, to achieve desirable results. In certain implementations, multitasking and parallel processing may be advantageous.

Figure 8:
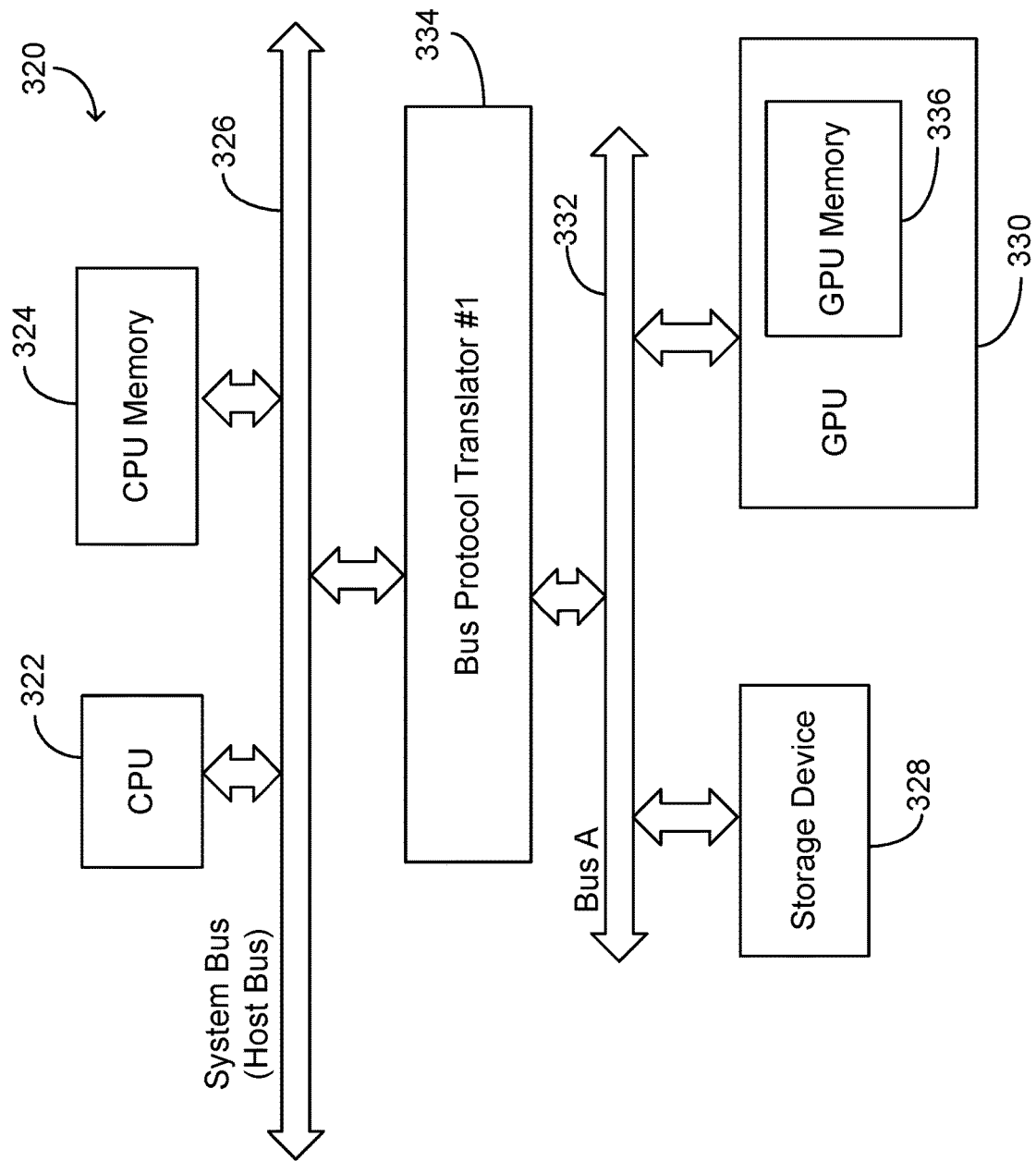
FIGS. 8 to 13 are block diagrams of exemplary computer systems.

Although some examples have been discussed above, other implementations and applications are also within the scope of the following claims. For example, the system bus 124 in the example of FIG. 1 can be any bus that enables peer-to-peer communication between a first device electrically coupled to the data bus and a second device electrically coupled to the data bus. Examples of such buses include Thunderbolt and NVLink. The DMA technique described above can be used for other types of co-processors that have memory that can be addressed directly through the system bus 124. For example, the co-processor can specialize in certain mathematical computations, such as certain encryption and decryption operations. The co-processor can specialize in performing complex physics computations, audio signal processing, and/or video signal processing. The co-processor can specialize in accelerating artificial neural networks. In this description, opening a file can mean opening a file stored on the storage device, or opening a device file corresponding to the storage device. For example, in Linux operating system (or other Unix-like operating systems), a device file is an interface for a device driver that appears in a file system as if it were an ordinary file. The device file allows software to interact with a device driver using standard input/output system calls. A device file can provide a simple interface to a peripheral device, such as a storage device, and can also be used to access specific resources on the device, such as a disk partition. An operating system kernel module can include a built-in module or a loadable module, In some implementations, the CPU(s), GPU(s), and storage device(s) can be connected to different bus that are coupled using a bus protocol translator. FIGS. 8-13 show examples of such computing systems. Referring to FIG. 8, in some implementations, a computing system 320 includes a CPU 322 and CPU memory 324 that are both electrically coupled to a system bus (host bus) 326. A storage device 328 and a graphics processor unit (GPU) 330 are electrically coupled to a bus A 332. The GPU 330 has GPU memory 336. A bus protocol translator #1 334 (or converter) is provided to translate (or convert) data from a format complying with the system bus protocol to a format complying with the bus A protocol, and vice versa. High data throughput can be achieved using the processes (e.g., 150, 180, or 240) described above to enable DMA data transfer between the storage device 328 and the GPU memory 336 through the bus A 332.

In this example, the DMA data transfer technique described above provides significant advantages when transferring data between the storage device 328 and the GPU memory 336 because it reduces the need to transfer data from the bus A 332 to the CPU memory 324 through the bus protocol translator #1 334 and system bus 326, and then from the CPU memory 324 to the bus A 332 through the system bus 326 and the bus protocol translator #1 334.

Figure 9:
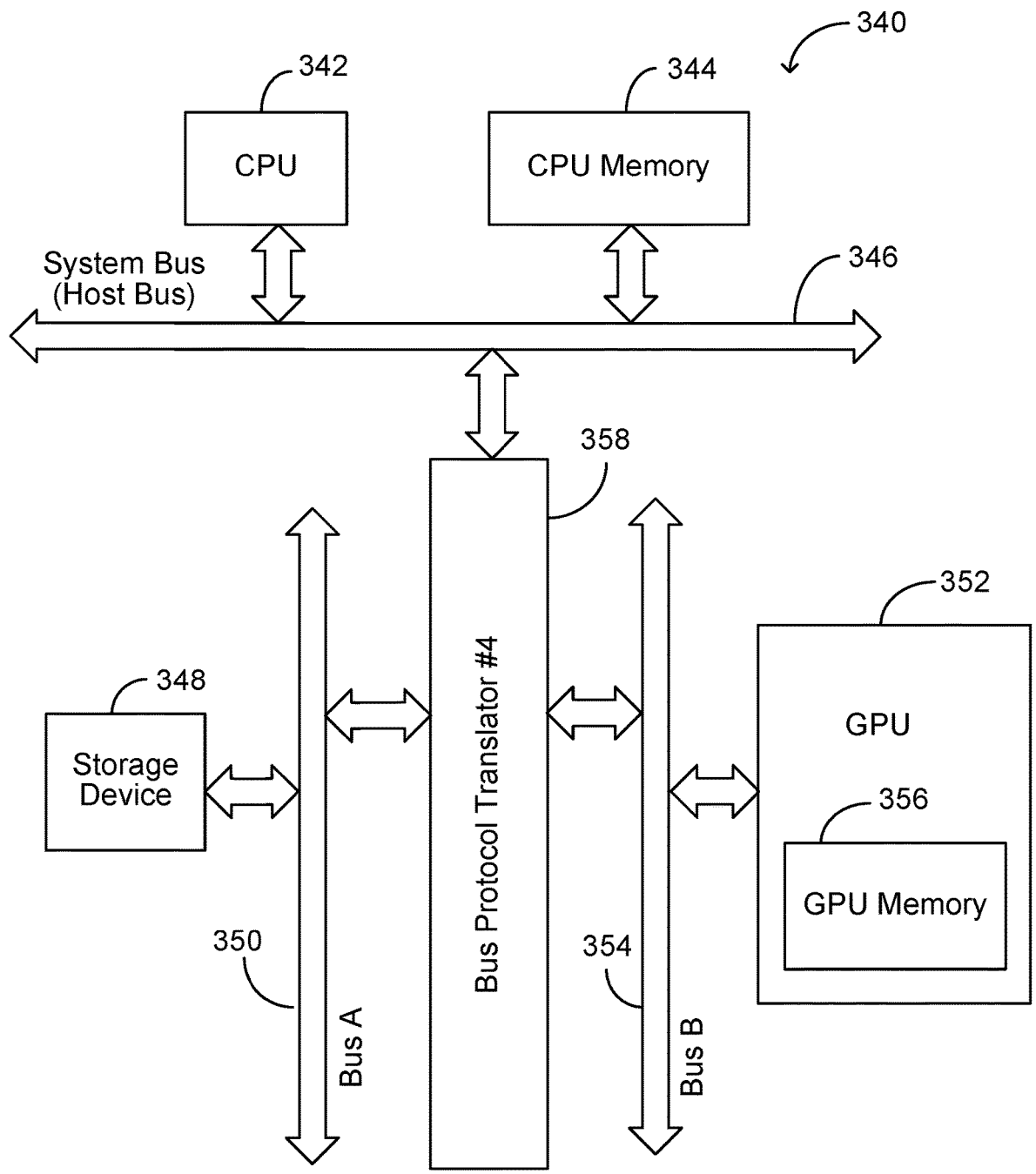

Referring to FIG. 9, in some implementations, a computing system 340 includes a CPU 342 and CPU memory 344 that are both electrically coupled to a system bus (host bus) 346. A storage device 348 is electrically coupled to a bus A 350. A GPU 352 is electrically coupled to a bus B 354. The GPU 352 has GPU memory 356. A bus protocol translator #4 358 (or converter) is provided to translate (or convert) data from a format complying with the system bus protocol to a format complying with the bus A protocol, and vice versa. The bus protocol translator #4 358 can translate data from a format complying with the system bus protocol to a format complying with the bus B protocol, and vice versa. The bus protocol translator #4 358 can also translate data from a format complying with the bus A protocol 350 to a format complying with the bus B protocol, and vice versa. High data throughput can be achieved using the processes (e.g., 150, 180, or 240) described above to enable DMA data transfer between the storage device 348 and the GPU memory 356 through the bus A 350, the bus protocol translator #4 358, and the bus B 354.

Figure 10:
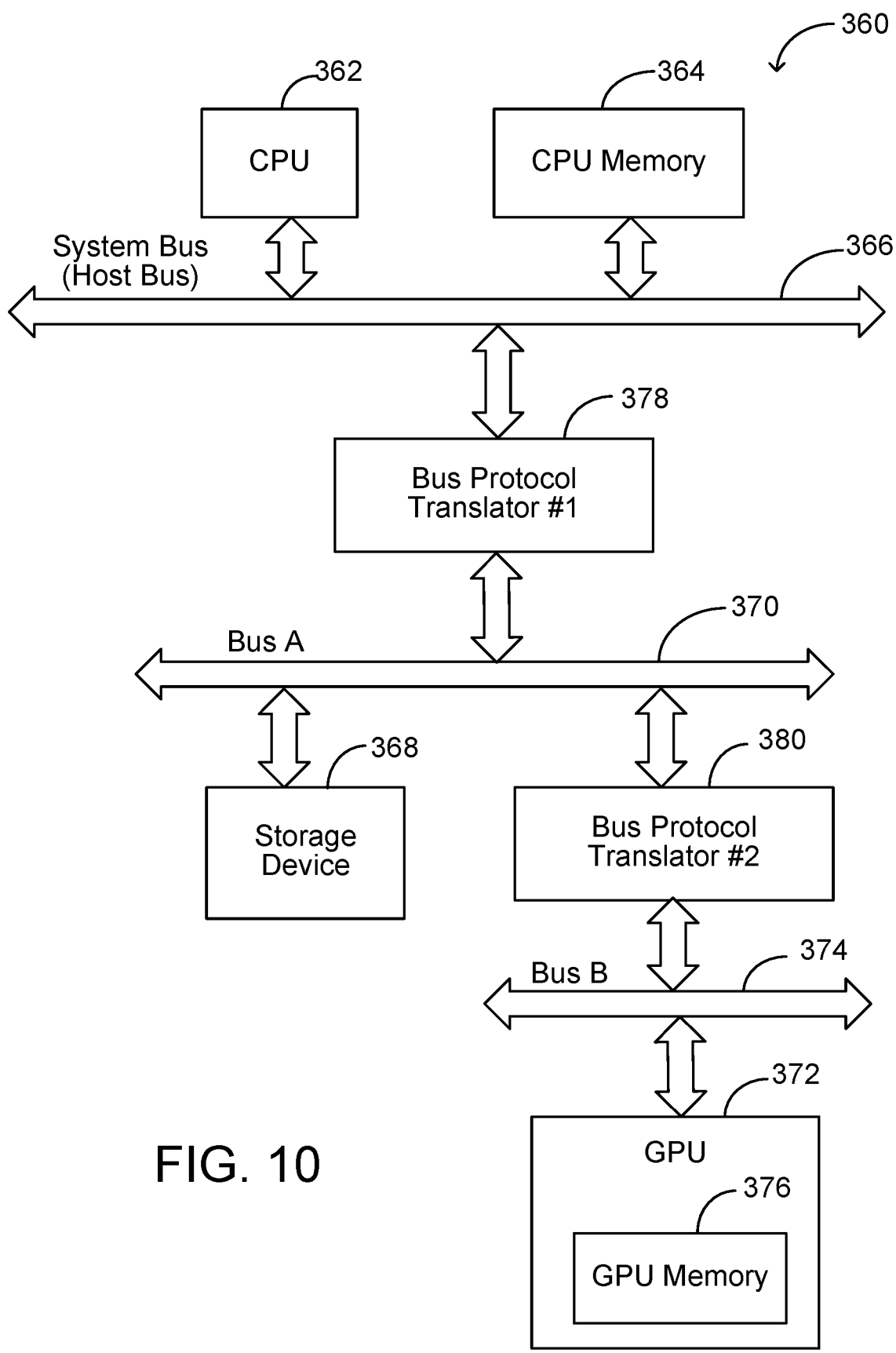

Referring to FIG. 10, in some implementations, a computing system 360 includes a CPU 362 and CPU memory 364 that are both electrically coupled to a system bus (host bus) 366. A storage device 368 is electrically coupled to a bus A 370. A GPU 372 is electrically coupled to a bus B 374. The GPU 372 has GPU memory 376. A bus protocol translator #1 378 (or converter) is provided to translate (or convert) data from a format complying with the system bus protocol to a format complying with the bus A protocol, and vice versa. A bus protocol translator #2 380 is provided to translate data from a format complying with the bus A protocol to a format complying with the bus B protocol, and vice versa. High data throughput can be achieved using the processes (e.g., 150, 180, or 240) described above to enable DMA data transfer between the storage device 368 and the GPU memory 376 through the bus A 370, the bus protocol translator #2 380, and the bus B 374.

Figure 11:
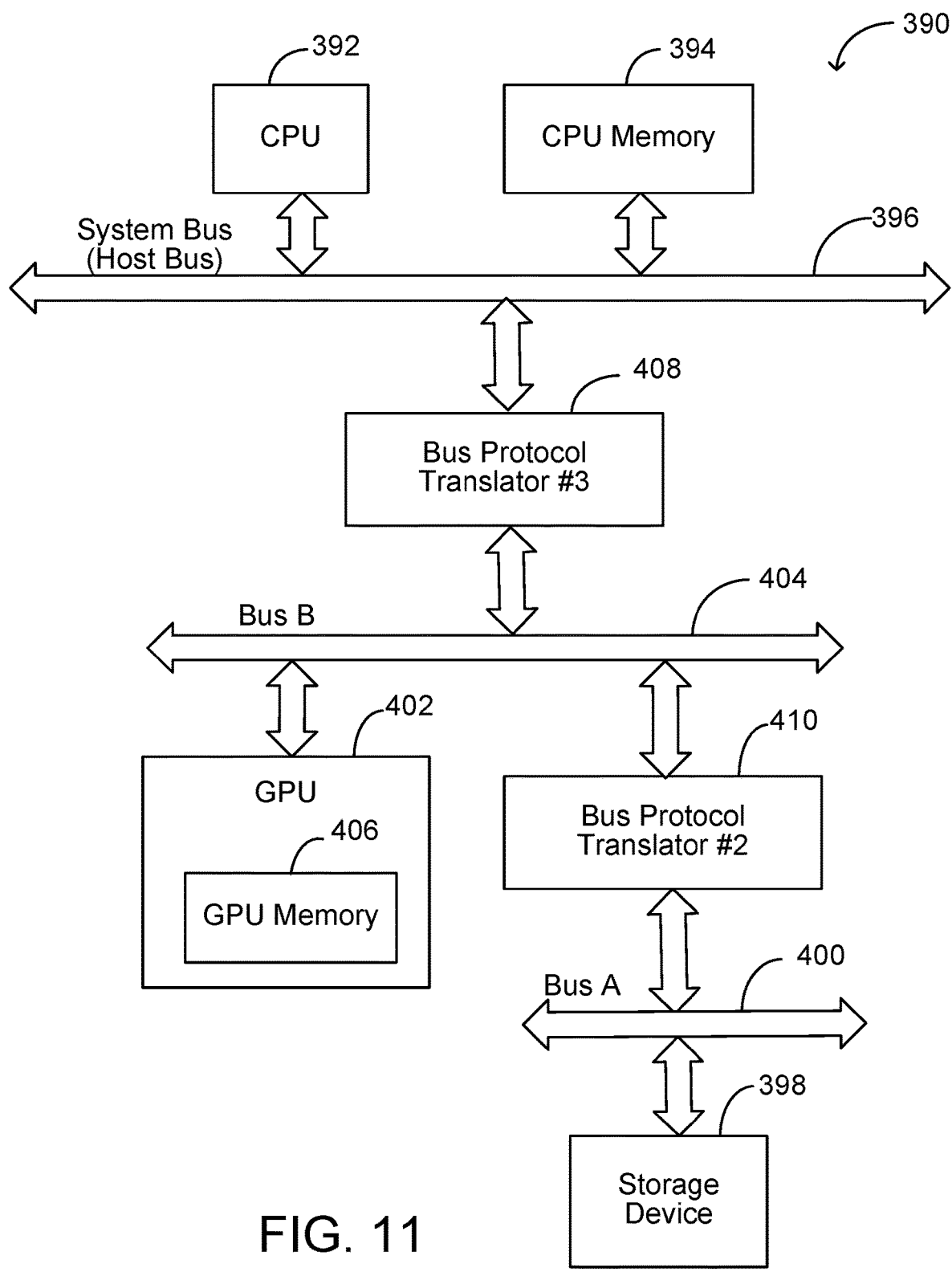

Referring to FIG. 11, in some implementations, a computing system 390 includes a CPU 392 and CPU memory 394 that are both electrically coupled to a system bus (host bus) 396. A storage device 398 is electrically coupled to a bus A 400. A GPU 402 is electrically coupled to a bus B 404. The GPU 402 has GPU memory 406. A bus protocol translator #3 408 (or converter) is provided to translate (or convert) data from a format complying with the system bus protocol to a format complying with the bus B protocol, and vice versa. A bus protocol translator #2 410 is provided to translate data from a format complying with the bus A protocol to a format complying with the bus B protocol, and vice versa. High data throughput can be achieved using the processes (e.g., 150, 180, or 240) described above to enable DMA data transfer between the storage device 398 and the GPU memory 406 through the bus A 400, the bus protocol translator #2 410, and the bus B 404.

Figure 12:
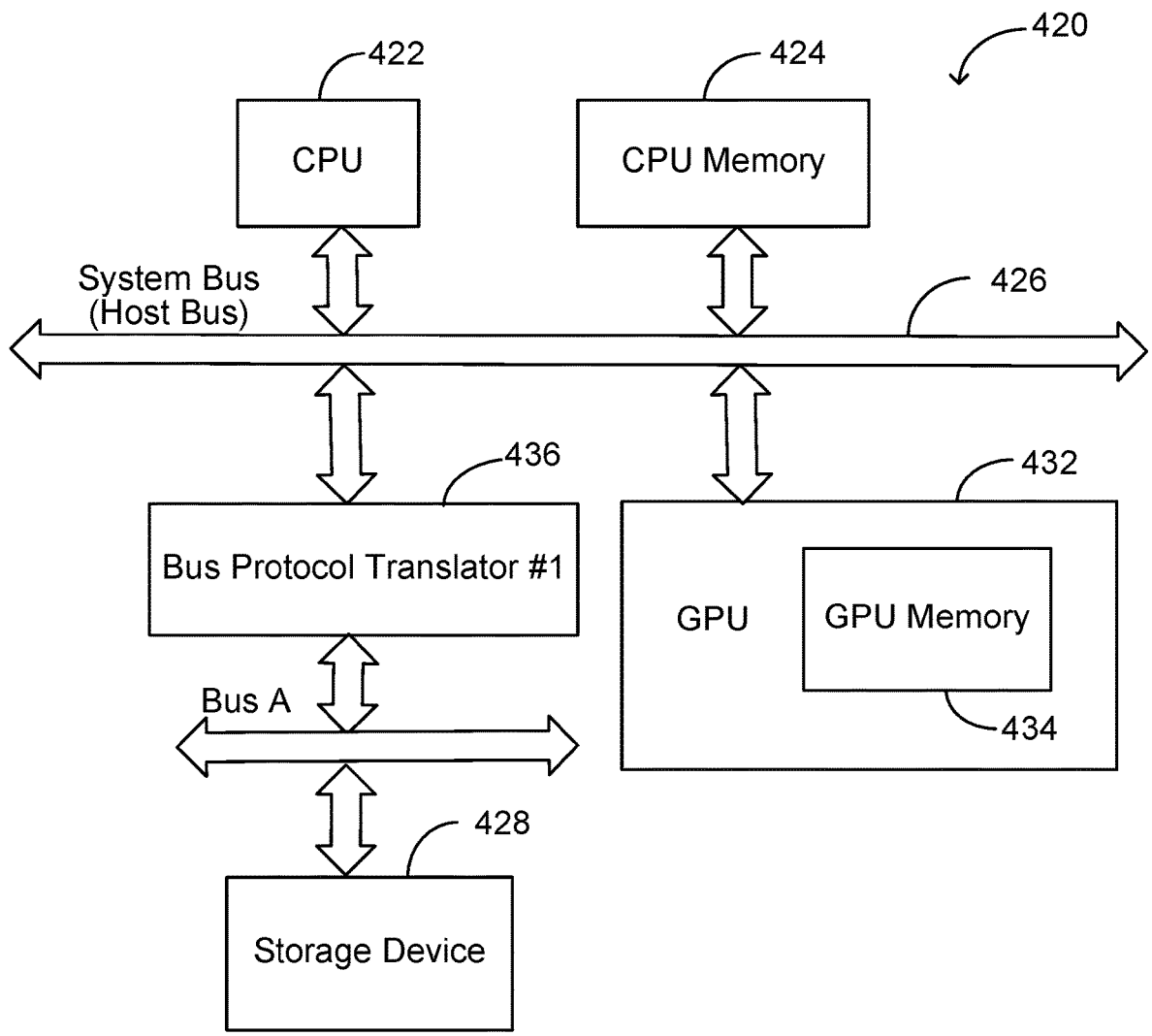

Referring to FIG. 12, in some implementations, a computing system 420 includes a CPU 422 and CPU memory 424 that are both electrically coupled to a system bus (host bus) 426. A storage device 428 is electrically coupled to a bus A 430. A GPU 432 is electrically coupled to the system bus 426. The GPU 432 has GPU memory 434. A bus protocol translator #1 436 (or converter) is provided to translate (or convert) data from a format complying with the system bus protocol to a format complying with the bus A protocol, and vice versa. High data throughput can be achieved using the processes (e.g., 150, 180, or 240) described above to enable DMA data transfer between the storage device 428 and the GPU memory 434 through the bus A 430, the bus protocol translator #1 436, and the system bus 426.

Figure 13:
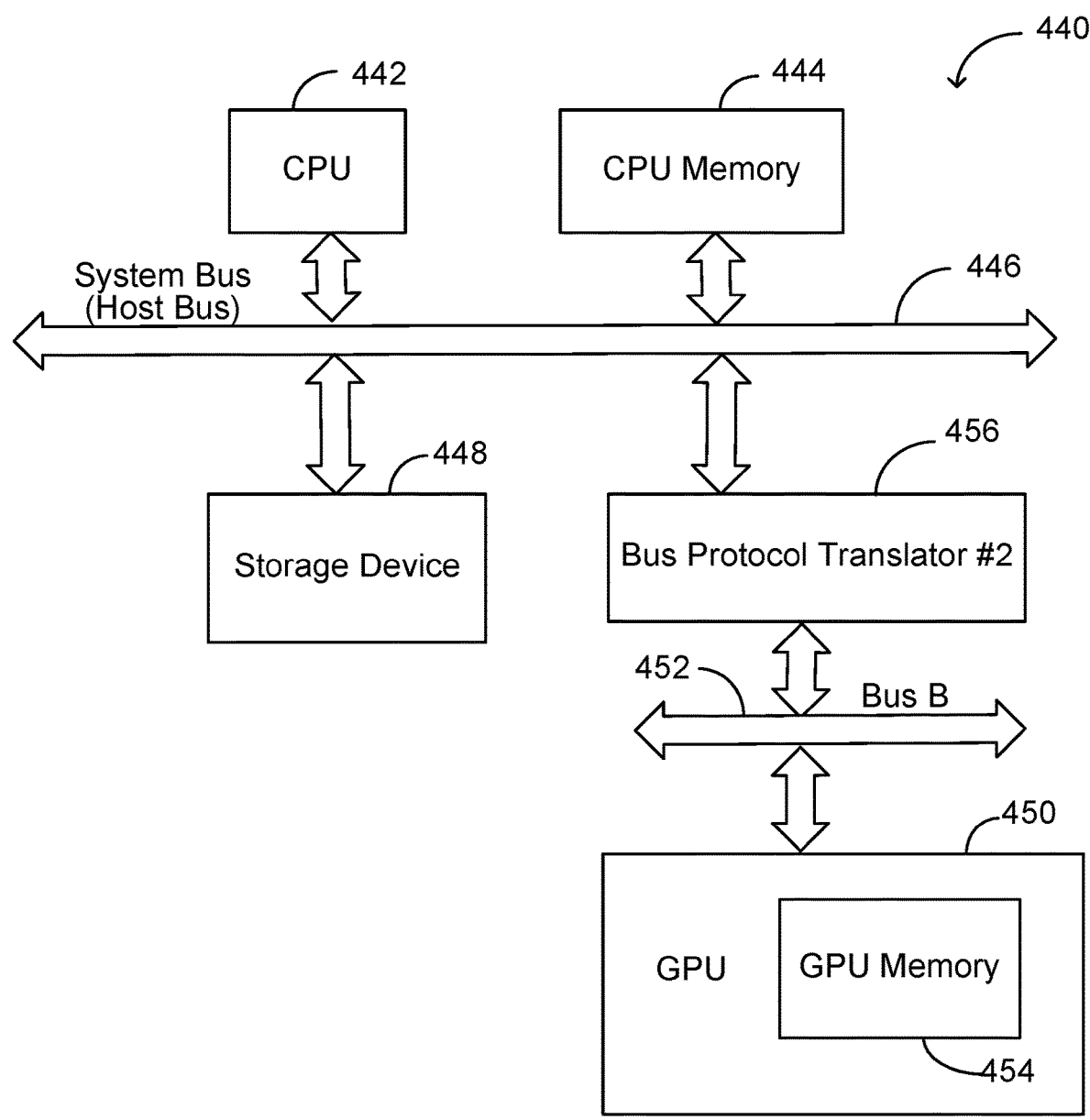

Referring to FIG. 13, in some implementations, a computing system 440 includes a CPU 442 and CPU memory 444 that are both electrically coupled to a system bus (host bus) 446. A storage device 448 is electrically coupled to a system bus 446. A GPU 450 is electrically coupled to a bus B 452. The GPU 450 has GPU memory 454. A bus protocol translator #2 456 (or converter) is provided to translate (or convert) data from a format complying with the system bus protocol to a format complying with the bus B protocol, and vice versa. High data throughput can be achieved using the processes (e.g., 150, 180, or 240) described above to enable DMA data transfer between the storage device 448 and the GPU memory 454 through the system bus 446, the bus protocol translator #2 456, and the bus B 452.

In the examples shown in FIGS. 8 to 13, the DMA data transfer technique described above provides significant advantages when transferring data between the storage device (e.g., 328, 348, 368, 398, 428, 448) and the GPU memory (e.g., 336, 356, 376, 406, 434, and 454) because it reduces the need to copy the data to the CPU memory (e.g., 324, 344, 364, 394, 424, 444).

Another advantage of the DMA data transfer technique described above is that CPU memory bandwidth contention in a multi-GPU environment can be reduced or eliminated. In a conventional system, when model training data (e.g., machine learning model training data) for each GPU is transferred simultaneously, GPUs and storage devices may be forced to contend for CPU memory bandwidth. By using the invention described above, the CPU memory bandwidth contention problem will be reduced or eliminated.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method of operating a computing system that comprises a central processing unit (CPU), CPU memory associated with the central processing unit, a graphics processing unit (GPU), GPU memory associated with the graphics processing unit, a storage device capable of direct memory access (DMA), and a peer-to-peer host bus, in which a first portion of the CPU memory is allocated as user space and a second portion of the CPU memory is allocated as kernel space, the user space configured for use by user applications, the kernel space configured for use by operating system kernel modules, the method comprising:
  at the central processing unit, for each of a plurality of regions of GPU physical memory, generating a data structure representing the GPU physical memory region, and storing the data structure in the kernel space, in which the data structure has a format that is consistent with a format used by an operating system of the computing system for representing a region of physical memory;
  allocating a first GPU virtual memory space for a user-space process;
  at the graphics processing unit, mapping the first GPU virtual memory space to a first GPU physical memory space comprising at least a region of GPU physical memory;
  based on the data structure representing the GPU physical memory region, mapping the first GPU physical memory space to a CPU virtual address associated with the user-space process;
  initiating a direct input/output operation on the storage device, using the CPU virtual address, which is mapped to the first GPU physical memory space;
  based on the data structure representing the GPU physical memory region, generating at least a bus address corresponding to the first GPU physical memory space, which is mapped to the CPU virtual address; and
  initiating, by using a device driver of the storage device, a direct memory access operation based on the bus address to transfer data between the storage device and the first GPU physical memory space through the peer-to-peer host bus.

2. The method of claim 1, in which initiating a direct memory access operation to transfer data between the storage device and the first GPU physical memory space comprises initiating a direct memory access operation to transfer data between the storage device and the first GPU physical memory space without copying the data to the CPU memory.

3. The method of claim 1, in which the computing system comprises a plurality of graphics processing units, each having associated GPU memory and being electrically coupled to the peer-to-peer host bus, and the method comprises initiating direct memory access operations to transfer data between the storage device and physical GPU memory spaces of the plurality of graphics processing units through the peer-to-peer host bus without copying the data to the CPU memory.

4. The method of claim 1, in which the computing system comprises a plurality of storage devices capable of direct memory access, each electrically coupled to the peer-to-peer host bus, and the method comprises initiating direct memory access operations to transfer data between the plurality of storage device and the physical GPU memory space of the graphics processing unit through the peer-to-peer host bus without copying the data to the CPU memory.

5. The method of claim 1, in which the computing system comprises a plurality of storage devices capable of direct memory access, each electrically coupled by the peer-to-peer host bus to a plurality of graphics processing units, each having associated GPU memory, and the method comprises initiating direct memory access operations to transfer data between the plurality of storage devices and physical GPU memory spaces of the plurality of graphics processing units through the peer-to-peer host bus without copying the data to the CPU memory.

6. The method of claim 1, in which generating at least a bus address corresponding to the first GPU physical memory space comprises using the device driver of the storage device to generate at least a bus address corresponding to the first GPU physical memory space.

7. The method of claim 1, in which generating at least a bus address corresponding to the first GPU physical memory space comprises using the operating system kernel to generate at least a bus address corresponding to the first GPU physical memory space.

8. The method of claim 1, in which the storage device comprises a non-volatile memory express (NVMe) storage device.

9. The method of claim 1, in which the storage device comprises at least one of a solid state storage device, a hard disk drive, an optical disc drive, a flash memory storage device, a resistive RAM storage device, a phase change memory storage device, or a magnetoresistive RAM storage device.

10. The method of claim 1, in which the storage device comprises at least one of a Serial AT Attachment (SATA) storage device, a Serial Attached SCSI (SAS) storage device, a Universal Serial Bus (USB) storage device, an IEEE1394 storage device, or a Fibre Channel storage device.

11. The method of claim 1, comprising maintaining a mapping between the first virtual GPU memory space and the first physical GPU memory space until the direct memory access operation has been completed.

12. The method of claim 1, in which the graphics processing unit comprises a CUDA enabled graphics processing unit, and the user-space process comprises a CUDA based application.

13. The method of claim 1, in which the peer-to-peer host bus comprises at least one of a peripheral component interconnect express (PCIe), Thunderbolt, or NVLink bus.

14. The method of claim 1, in which initiating a direct input/output operation on the storage device using the CPU virtual address comprises:
  opening a file; and
  passing the CPU virtual address to at least one of a read system call, a write system call, a system call equivalent to the read system call, or a system call equivalent to the write system call by the user-space process.

15. The method of claim 1, comprising using the user-space process to:
  call a first function associated with the graphics processing unit to allocate a first virtual GPU memory space;
  call a second function associated with the graphics processing unit to map the first GPU virtual memory space to a first GPU physical memory space; and
  call a third function to map the first GPU physical memory space to a CPU virtual address associated with the user-space process based on the data structure representing the GPU physical memory region.

16. The method of claim 15, in which the third function comprises ensuring that neither a VM_IO flag nor a VM_PF-NMAP flag is set for the user-space process.

17. The method of claim 1, in which the operating system comprises Linux operating system, and the data structure comprises a struct page or a data structure equivalent to the struct page.

18. The method of claim 1 in which generating a data structure comprises generating a data structure representing the GPU physical memory region, and the data structure comprises a flags field that describes at least one of the state, status, attribute, or characteristic of the region of physical memory.

19. A method of operating a computing system that comprises a central processing unit, CPU memory associated with the central processing unit, a co-processor, co-processor memory associated with the co-processor, a storage device capable of direct memory access (DMA), and a peer-to-peer host bus, in which a first portion of the CPU memory is allocated as user space and a second portion of the CPU memory is allocated as kernel space, the user space configured for use by user applications, the kernel space configured for use by operating system kernel modules, the method comprising:

at the central processing unit, for each of a plurality of regions of co-processor physical memory, generating a data structure representing the co-processor physical memory region, and storing the data structure in the kernel space, in which the data structure has a format that is consistent with a format used by an operating system of the computing system for representing a region of physical memory;

allocating a first co-processor virtual memory space for a user-space process;

at the co-processor, mapping the first co-processor virtual memory space to a first co-processor physical memory space comprising at least a region of co-processor physical memory;

based on the data structure representing the co-processor physical memory region, mapping the first co-processor physical memory space to a CPU virtual address associated with the user-space process;

initiating a direct input/output operation on the storage device, using the CPU virtual address, which is mapped to the first co-processor physical memory space;

based on the data structure representing the co-processor physical memory region, generating at least a bus address corresponding to the first co-processor physical memory space, which is mapped to the CPU virtual address; and initiating, using a device driver of the storage device, a direct memory access operation based on the bus address to transfer data between the storage device and the first co-processor physical memory space through the peer-to-peer host bus.

20. The method of claim 19, in which initiating a direct memory access operation to transfer data between the storage device and the first co-processor physical memory space comprises initiating a direct memory access operation to transfer data between the storage device and the first co-processor physical memory space without copying the data to the CPU memory.

21. The method of claim 19, in which the computing system comprises a plurality of co-processors, each having associated co-processor memory and being electrically coupled to the peer-to-peer host bus, and the method comprises initiating direct memory access operations to transfer data between the storage device and physical co-processor memory spaces of the plurality of co-processors through the peer-to-peer host bus without copying the data to the CPU memory.

22. The method of claim 19, in which the computing system comprises a plurality of storage devices capable of direct memory access, each electrically coupled to the peer-to-peer host bus, and the method comprises initiating direct memory access operations to transfer data between the plurality of storage device and the physical co-processor memory space of the co-processor through the peer-to-peer host bus without copying the data to the CPU memory.

23. The method of claim 19, in which the computing system comprises a plurality of storage devices capable of direct memory access, each electrically coupled by the peer-to-peer host bus to a plurality of co-processors, each having associated co-processor memory, and the method comprises initiating direct memory access operations to transfer data between the plurality of storage devices and physical co-processor memory spaces of the plurality of co-processors through the peer-to-peer host bus without copying the data to the CPU memory.

24. A computing system, comprising:
a central processing unit (CPU);
CPU memory associated with the central processing unit, in which a first portion of the CPU memory is configured to be allocated as user space and a second portion of the CPU memory is configured to be allocated as kernel space, the user space configured for use by user applications, the kernel space configured for use by operating system kernel modules;
a general purpose graphics processing unit having a plurality of processing cores;
GPU memory associated with the general purpose graphics processing unit;
a storage device capable of direct memory access; and
a peer-to-peer host bus;
wherein the central processing unit, the general purpose graphics processing unit, and the storage device are configured to:
execute a user process in the user space of the CPU memory;
for each of a plurality of regions of GPU physical memory, generate a data structure representing the GPU physical memory region, and store the data structure in the kernel space, in which the data structure has a format that is consistent with a format used by an operating system of the computing system for representing a region of physical memory;
allocate a first GPU virtual memory space;
map the first GPU virtual memory space to a first GPU physical memory space comprising at least a region of GPU physical memory;
based on the data structure representing the GPU physical memory region, map the first GPU physical memory space to a CPU virtual address associated with the user process;
initiate a direct input/output operation on the storage device, using the CPU virtual address, which is mapped to the first GPU physical memory space;
based on the data structure representing the GPU physical memory region, generate at least a bus address corresponding to the first GPU physical memory space, which is mapped to the CPU virtual address; and
initiate, by using a device driver of the storage device, a direct memory access (DMA) operation based on the bus address to transfer data between the storage device and the first GPU physical memory space through the peer-to-peer host bus.

25. The computing system of claim 24, in which initiating a direct input/output operation on the storage device using the CPU virtual address comprises:
   opening a file; and
   passing the CPU virtual address to at least one of a read system call, a write system call, a system call equivalent to the read system call, or a system call equivalent to the write system call.

26. The computing system of claim 25 in which opening a file comprises at least one of (i) opening a file stored on the storage device, or (ii) opening a device file corresponding to the storage device.

27. The computing system of claim 25, in which the operating system kernel is further configured to avoid copying data between user space and kernel space, and instead transfer the data directly between the GPU memory and the storage device, using direct memory access.

28. The computing system of claim 27, in which the operating system kernel is further configured to identify based on the CPU virtual address each data structure that corresponds to the first physical GPU memory space.

29. The computing system of claim 28, in which the operating system kernel is further configured to send at least a read request or at least a write request, each with at least an identified data structure that corresponds to the GPU physical memory space, to the device driver of the storage device.

30. The computing system of claim 24, in which the central processing unit is configured to execute the user process to:
   call a first function associated with the graphics processing unit to allocate the first GPU virtual memory space;
   call a second function associated with the graphics processing unit to map the first GPU virtual memory space to the first GPU physical memory space; and
   call a third function to map the first GPU physical memory space to a CPU virtual address associated with the user process based on the data structure representing the GPU physical memory region.

31. The computing system of claim 30, in which the first function is configured to return a user-space pointer that points to the allocated first GPU virtual memory space.

32. The computing system of claim 31, in which executing the user process to call the second function comprises passing the user-space pointer to the second function.

33. The computing system of claim 32, in which the second function is configured to return a GPU memory mapping handle associated with the mapping between the first GPU virtual memory space and the first GPU physical memory space.

34. The computing system of claim 33, in which executing the user processor to call the third function comprises passing the GPU memory mapping handle to the third function.

35. The computing system of claim 34, in which the third function is configured to comprise:
   identifying each region of the first GPU physical memory space by the GPU memory mapping handle;
   inserting each region, by the corresponding data structure, of the first GPU physical memory into the user process; and
   returning a CPU virtual address that is mapped to the first physical GPU memory space.

36. The computing system of claim 35, in which each of a plurality of regions of GPU physical memory comprises each of a plurality of pages of GPU physical memory, and each data structure represents a page of GPU physical memory.

37. The computing system of claim 36, in which the operating system comprises Linux operating system, and the data structure comprises a struct page or a data structure equivalent to the struct page.

38. The computing system of claim 37, in which the third function is configured to comprise ensuring that neither VM_IO nor VM_PFNMAP is set for the user process.

39. The computing system of claim 24, in which the central processing unit is configured to execute the device driver of the storage device to generate at least a bus address corresponding to the first GPU physical memory space.

40. The computing system of claim 24, in which the operating system kernel is configured to generate at least a bus address corresponding to the first GPU physical memory space.

41. The computing system of claim 24, in which the peer-to-peer host bus comprises at least one of a peripheral component interconnect express (PCIe), Thunderbolt, or NVLink bus.

42. The computing system of claim 24, in which the storage device comprises a non-volatile memory express (NVMe) storage device.

43. The computing system of claim 24, in which the storage device comprises at least one of a solid state storage device, a hard disk drive, an optical disc drive, a flash memory storage device, a resistive RAM storage device, a phase change memory storage device, or a magnetoresistive RAM storage device.

44. The computing system of claim 24, in which the central processing unit, the graphics processing unit, and the storage device are configured to initiate the direct memory access operation to transfer data between the storage device and the first GPU physical memory space without copying the data to the CPU memory.

45. The computing system of claim 24, in which the computing system comprises a plurality of graphics processing units, each having associated GPU memory and being electrically coupled to the peer-to-peer host bus, and the central processing unit, the plurality of graphics processing units, and the storage device are configured to initiate direct memory access operations to transfer data between the storage device and physical GPU memory spaces of the plurality of graphics processing units through the peer-to-peer host bus without copying the data to the CPU memory.

46. The computing system of claim 24, in which the computing system comprises a plurality of storage devices capable of direct memory access, each electrically coupled to the peer-to-peer host bus, and the central processing unit, the graphics processing unit, and the plurality of storage devices are configured to initiate direct memory access operations to transfer data between the plurality of storage device and the physical GPU memory space of the graphics processing unit through the peer-to-peer host bus without copying the data to the CPU memory.

47. The computing system of claim 24, in which the computing system comprises a plurality of storage devices capable of direct memory access, each electrically coupled to a plurality of graphics processing units through the peer-to-peer host bus, each GPU having associated GPU memory, and the central processing unit, the plurality of graphics processing units, and the plurality of storage devices are configured to initiate direct memory access operations to transfer data between the plurality of storage devices and physical GPU memory spaces of the plurality of graphics processing units through the peer-to-peer host bus without copying the data to the CPU memory.

48. The computing system of claim 24, in which the graphics processing unit comprises a CUDA enabled graphics processing unit, and the user process comprises a CUDA based application.

49. The computing system of claim 24, in which the graphics processing unit comprises an AMD graphics processing unit, and the user process comprises a ROCm based application.

50. The computing system of claim 24, comprising maintaining a mapping between the first virtual GPU memory space and the first physical GPU memory space until the direct memory access operation has been completed.

51. The computing system of claim 24, comprising at least one of a self-driving vehicle or robot having machine-learning capabilities, in which the user process comprises an application program for controlling an operation of the self-driving vehicle or robot.

52. The computing system of claim 24 in which generating a data structure representing the GPU physical memory region comprises using an operating system kernel module to generate a data structure representing the GPU physical memory region.

53. The computing system of claim 52 in which the operating system kernel modules comprise at least one of a built-in module or a loadable module.

54. A vehicle comprising:
a central processing unit (CPU);
CPU memory associated with the central processing unit, in which a first portion of the CPU memory is configured to be allocated as user space and a second portion of the CPU memory is configured to be allocated as kernel space, the user space configured for use by applications for controlling the vehicle, the kernel space configured for use by operating system kernel modules;
at least one general purpose graphics processing unit, each graphics processing unit having a plurality of processing cores and associated GPU memory;
a storage device capable of direct memory access, the storage device storing data useful for controlling the vehicle; and
a peer-to-peer host bus;
wherein the central processing unit, the graphics processing unit, and the storage device are configured to:
execute a vehicle application in the user space of the CPU memory;
for each of a plurality of regions of GPU physical memory, generate a data structure representing the GPU physical memory region, and store the data structure in the kernel space, in which the data structure has a format that is consistent with a format used by an operating system of the vehicle for representing a region of physical memory;
allocate a first virtual GPU memory space;
map the first virtual GPU memory space to a first physical GPU memory space comprising at least a region of GPU physical memory;
based on the data structure representing the first GPU physical memory region, map the first physical GPU memory space to a CPU virtual address associated with the vehicle application;
initiate a direct input/output operation on the storage device, using the CPU virtual address, which is mapped to the first physical GPU memory space;
based on the data structure representing the GPU physical memory region, generate at least a bus address corresponding to the first GPU physical memory space, which is mapped to the CPU virtual address;
initiate, by using a device driver of the storage device, a direct memory access (DMA) operation based on the bus address to transfer data between the storage device and the first physical GPU memory space through the peer-to-peer host bus without copying the data to the CPU memory;
use the graphics processing unit to process the data to generate an output; and
use the output generated by the graphics processing unit to control an operation of the vehicle.

55. The vehicle of claim 54, in which the vehicle application comprises a vehicle self-driving application, and transferring data between the storage device and the first physical GPU memory space comprises transferring data useful for determining road conditions from the storage device to the first physical GPU memory space.

56. A computer readable medium storing computer executable instructions that when executed by a computing system that includes a central processing unit, CPU memory associated with the central processing unit, a graphics processing unit, GPU memory associated with the graphics processing unit, a storage device capable of direct memory access, and a peer-to-peer host bus, in which a first portion of the CPU memory is allocated as user space and a second portion of the CPU memory is allocated as kernel space, the user space configured for use by user applications, the kernel space configured for use by operating system kernel modules, causes the computing system to perform:
at the central processing unit, for each of a plurality of regions of GPU physical memory, generating a data structure representing the GPU physical memory region, and storing the data structure in the kernel space, in which the data structure has a format that is consistent with a format used by an operating system of the computing system for representing a region of physical memory;
allocating a first virtual GPU memory space for a user-space process;
at the graphics processing unit, mapping the first virtual GPU memory space to a first physical GPU memory space comprising at least a region of GPU physical memory;
based on the data structure representing the GPU physical memory region, mapping the first physical GPU memory space to a CPU virtual address associated with the user-space process;
initiating a direct input/output operation on the storage device, using the CPU virtual address, which is mapped to the first physical GPU memory space;
based on the data structure representing the GPU physical memory region, generating at least a bus address corresponding to the first GPU physical memory space, which is mapped to the CPU virtual address; and
initiating, by using a device driver of the storage device, a direct memory access (DMA) operation based on the bus address to transfer data between the storage device and the first physical GPU memory space through the peer-to-peer host bus.

57. The computer readable medium of claim 56, in which initiating a direct input/output operation on the storage device using the CPU virtual address comprises:
- opening a file; and
- passing the CPU virtual address to at least one of a read system call, a write system call, a system call equivalent to the read system call, or a system call equivalent to the write system call by the user-space process.

58. The computer readable medium of claim 57 in which opening a file comprises at least one of (i) opening a file stored on the storage device, or (ii) opening a device file corresponding to the storage device.

\* \* \* \* \*

UNITED STATES PATENT AND TRADEMARK OFFICE
CERTIFICATE OF CORRECTION

| | | |
|---|---|---|
| PATENT NO. | : 10,489,881 B2 | Page 1 of 1 |
| APPLICATION NO. | : 15/808077 | |
| DATED | : November 26, 2019 | |
| INVENTOR(S) | : Yuan-Chih Yang | |

It is certified that error appears in the above-identified patent and that said Letters Patent is hereby corrected as shown below:

On the Title Page

Right column, under "Other Publications," Line 3, delete "hhttps" and insert -- https --.

Right column, under "Other Publications," Line 4, delete "htmll" and insert -- html --.

Signed and Sealed this
Seventeenth Day of March, 2020

Andrei Iancu
*Director of the United States Patent and Trademark Office*